US011506021B2

(12) United States Patent
Yu

(10) Patent No.: US 11,506,021 B2
(45) Date of Patent: Nov. 22, 2022

(54) DYNAMIC FIELD OPERATIONS SYSTEM

(71) Applicant: Schlumberger Technology Corporation, Sugar Land, TX (US)

(72) Inventor: Yingwei Yu, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 157 days.

(21) Appl. No.: 16/604,567

(22) PCT Filed: Jun. 15, 2018

(86) PCT No.: PCT/US2018/037680
§ 371 (c)(1),
(2) Date: Oct. 11, 2019

(87) PCT Pub. No.: WO2018/232189
PCT Pub. Date: Dec. 20, 2018

(65) Prior Publication Data
US 2020/0347700 A1  Nov. 5, 2020

Related U.S. Application Data

(60) Provisional application No. 62/519,975, filed on Jun. 15, 2017.

(51) Int. Cl.
*E21B 41/00* (2006.01)
*E21B 47/00* (2012.01)
*G01V 1/46* (2006.01)
*G01V 1/48* (2006.01)
(Continued)

(52) U.S. Cl.
CPC .............. *E21B 41/00* (2013.01); *E21B 47/00* (2013.01); *E21B 47/18* (2013.01); *E21B 49/00* (2013.01); *G01V 1/46* (2013.01); *G01V 1/48* (2013.01)

(58) Field of Classification Search
CPC .......... E21B 41/00; E21B 47/00; E21B 47/18; E21B 49/00; G01V 1/46; G01V 1/48
See application file for complete search history.

(56) References Cited

U.S. PATENT DOCUMENTS

| | | | |
|---|---|---|---|
| 2004/0206494 A1* | 10/2004 | Stephenson | G01V 1/50 166/250.1 |
| 2013/0213128 A1 | 8/2013 | Gleitman | |
| 2014/0131564 A1 | 5/2014 | Duraj et al. | |

(Continued)

FOREIGN PATENT DOCUMENTS

| WO | 2013/044345 A1 | 4/2013 |
|---|---|---|
| WO | 2016/057122 A1 | 4/2016 |

OTHER PUBLICATIONS

Leavey et al., "An introduction to wavelet transforms: a tutorial approach", Insight vol. 45 No. 5 May 2003 (Year: 2003).*

(Continued)

*Primary Examiner* — Regis J Betsch
(74) *Attorney, Agent, or Firm* — Alec J. McGinn

(57) ABSTRACT

A method includes acquiring data associated with a field operation of equipment in a geologic environment; filtering the data using a filter where the filter includes, along a dimension, a single maximum positive value that decreases to a single minimum negative value that increases to approximately zero; and, based on the filtering, issuing a control signal to the equipment in the geologic environment.

20 Claims, 25 Drawing Sheets

(51) Int. Cl.
  *E21B 47/18* (2012.01)
  *E21B 49/00* (2006.01)

(56) References Cited

U.S. PATENT DOCUMENTS

| | | | | |
|---|---|---|---|---|
| 2014/0277752 | A1* | 9/2014 | Chang | E21B 44/00 700/275 |
| 2015/0160101 | A1 | 6/2015 | Gao et al. | |
| 2016/0054729 | A1* | 2/2016 | Payette | E21B 44/04 700/275 |
| 2016/0132747 | A1* | 5/2016 | Sharma | G06V 10/758 382/170 |

OTHER PUBLICATIONS

Juan Guillermo Paniagua, "Laguerre Gaussian filters in Reverse Time Migration image reconstruction", Copyright 2016, SBGf—Sociedade Brasileira de Geofisica (Year: 2016).*

Amara et al., "The Offshore Directional Drilling Advisor: an Expert System for Directional Drilling Optimization", 65th Annual Technical Conference and Exhibition of the Society of Petroleum Engineers held in New Orleans, LA, Sep. 23-26, 1990.

Canny, "A computational approach to edge detection," IEEE Trans. Pattern Analysis and Machine Intelligence, 8(6), pp. 679-698.

Cayeux et al., "Automatic Performance Analysis and Estimation of Risk Level Embedded in Drilling Operations plan", SPE Intelligent Energy International Conference and Exhibition held in Aberdeen, UK, Sep. 6-8, 2016.

Cayeux et al., "ODDA: An Expert System for Planning and Conducting Directional Drilling", SPE European Petroleum Computer Conference held in Stavanger, Norway May 25-27, 1992.

Cope, et al., "Analysis of multidimensional difference-of-gaussians filters in terms of directly observable parameters," Journal of the Optical Society of America A, vol. 30, No. 5, May 2013, pp. 1002-1012.

Daireaux et al., "Use of Quantitative Risk Analysis Methods to Determine the Expected Drilling Parameter Operating Window Prior to Operation Start: Example from Two Wells in the North Sea", SPE/IADC Drilling Conference and Exhibition held in The Hague, The Netherlands, Mar. 14-16, 2017.

Marr, et al., "Theory of edge detection," Proceedings of the Royal Society of London. 1980, B207, pp. 187-217.

Metcalfe, "Statistics in engineering," Chapman & Hall, 1994.

Paniagua, et al., "Laguerre Gaussian filters in Reverse Tine Migration image reconstruction," in: VII Simposio Brasileiro de Geofisica, Oct. 2016, Siciedade Brasileira de Geofisica.

Xu et al., "Directional Trajectory Control by Employing Statistics and Probability Methods", SPE International Meeting an Petroleum Engineering held in Beijing, China, Mar. 24-27, 1992.

International Search Report and Written Opinion for the equivalent International patent application PCT/US2018/037680 dated Aug. 31, 2018.

Extended European Search Report dated Dec. 14, 2020 in counterpart European Patent Application No. 18818836.1.

\* cited by examiner

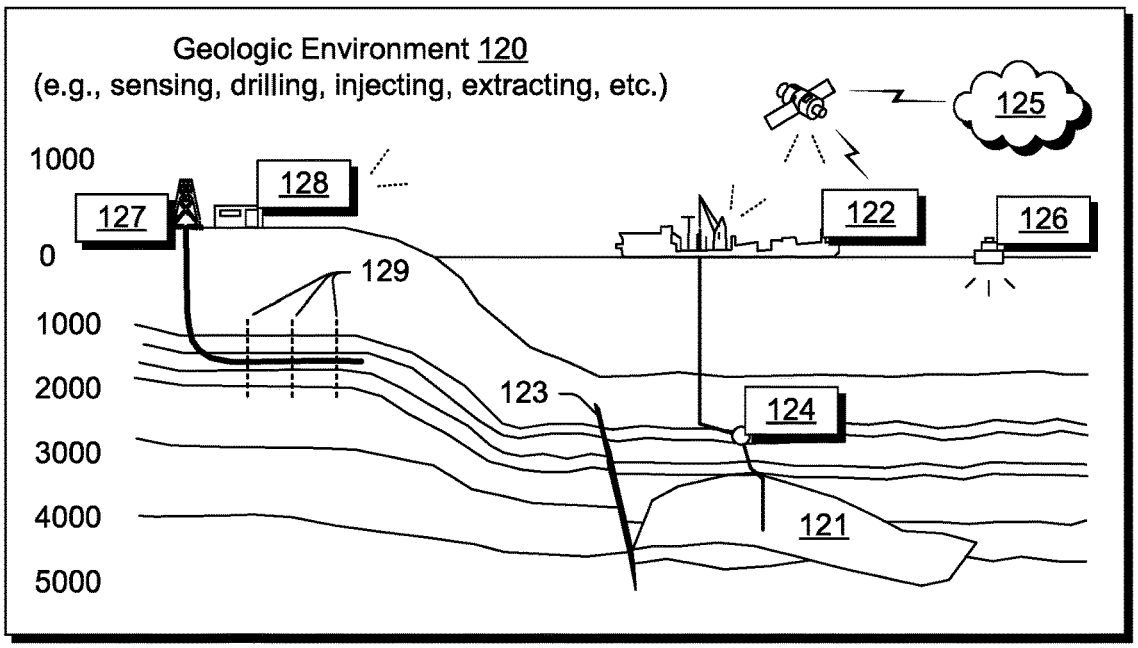
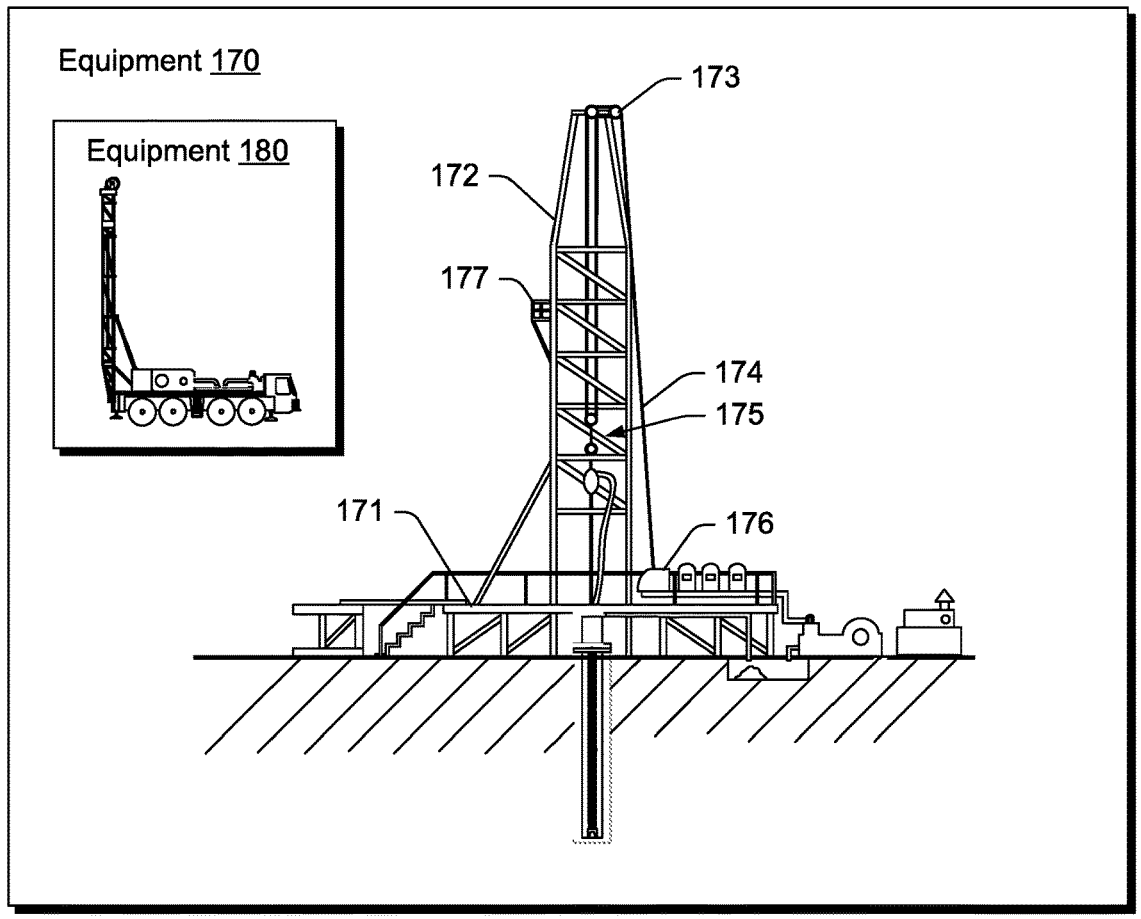
Fig. 1

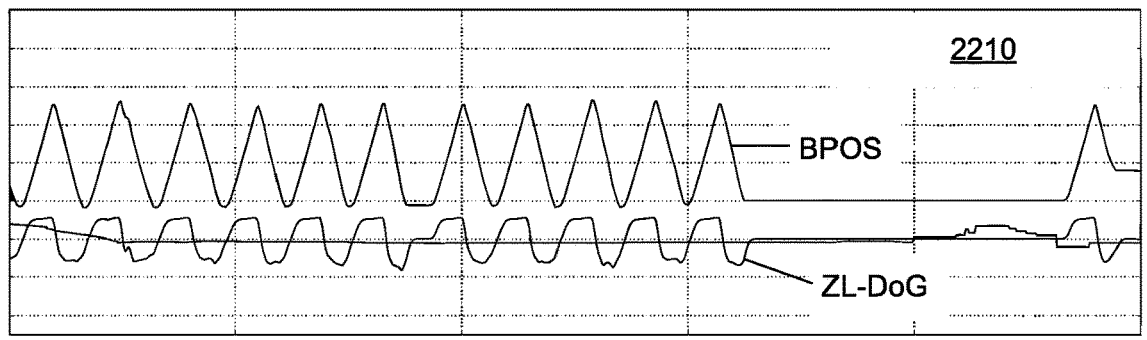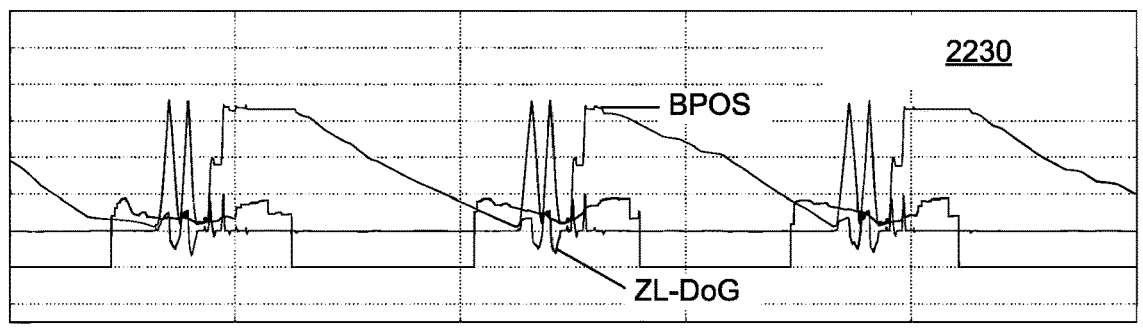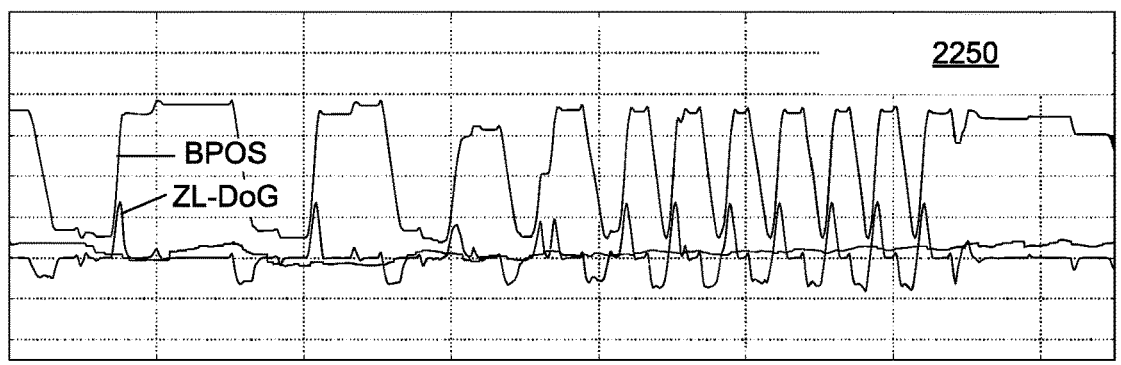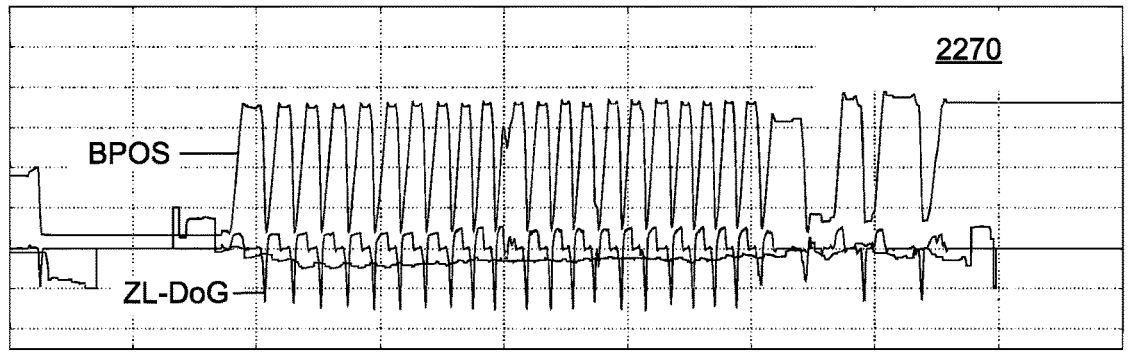
Fig. 22

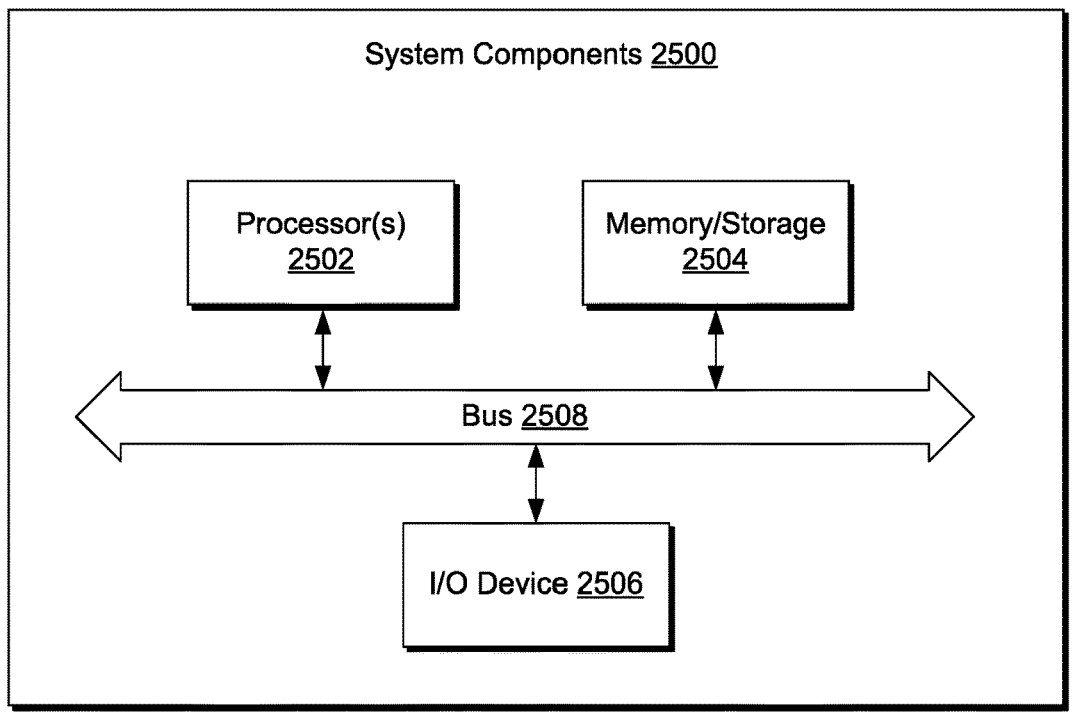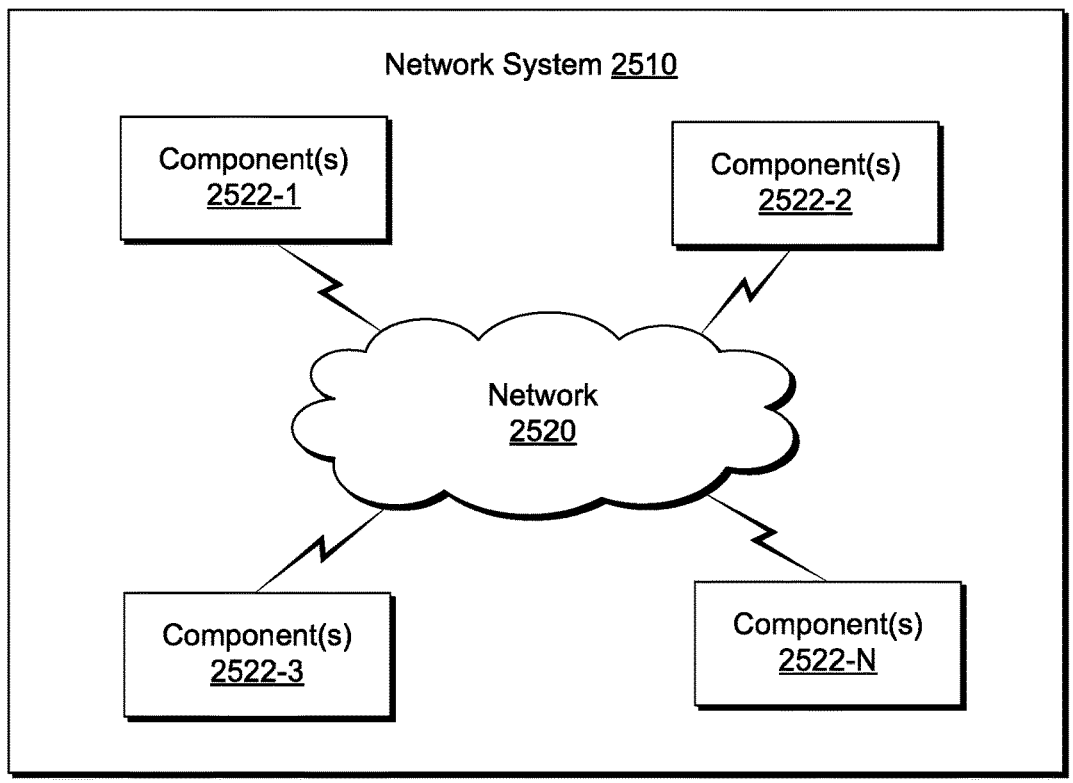
Fig. 25

DYNAMIC FIELD OPERATIONS SYSTEM

RELATED APPLICATION

This application claims priority to and the benefit of a U.S. Provisional Application having Ser. No. 62/519,975, filed 15 Jun. 2017, which is incorporated by reference herein.

BACKGROUND

Various field operations can be performed with respect to a geologic environment. Such operations can include exploration operations, development operations, production operations, etc., with respect to a reservoir in the geologic environment. As an example, an operation can be a drilling operation where a bore can be drilled into a geologic environment where the bore may be utilized to form a well. A rig may be a system of components that can be operated to form a bore in a geologic environment, to transport equipment into and out of a bore in a geologic environment, etc. As an example, a rig may include a system that can be used to drill a bore and to acquire information about a geologic environment, drilling, etc. As an example, a rig can include one or more of the following components and/or equipment: a mud tank, a mud pump, a derrick or a mast, drawworks, a rotary table or a top drive, a drillstring, power generation equipment and auxiliary equipment. As an example, an offshore rig may include one or more of such components, which may be on a vessel or a drilling platform.

SUMMARY

A method can include acquiring data associated with a field operation of equipment in a geologic environment; filtering the data using a filter where the filter includes, along a dimension, a single maximum positive value that decreases to a single minimum negative value that increases to approximately zero; and, based on the filtering, issuing a control signal to the equipment in the geologic environment. In such an example, the data can include 1-D time series data where the dimension corresponds to time. In such an example, the filter can include a time window value defined along the dimension. In such an example, the filter can be defined by the single maximum positive value that decreases to the single minimum negative value that increases to approximately zero as well as the time window value, which can define a position of the single maximum positive value and a position of the point that is approximately zero (e.g., or null). In such an example, the filter may be a function, which may be defined by a difference between two Gaussian distributions where each is defined by a corresponding standard deviation. A system can include one or more processors; a network interface operatively coupled to the one or more processors; memory operatively coupled to the one or more processors; and processor-executable instructions stored in the memory and executable by at least one of the processors to instruct the system to: acquire data associated with a field operation of equipment in a geologic environment; apply a filter to the data where the filter includes, along a dimension, a single maximum positive value that decreases to a single minimum negative value that increases to approximately zero; and based on application of the filter to the data, issue a control signal to the equipment in the geologic environment. One or more computer-readable storage media can include computer-executable instructions executable to instruct a computing system to: acquire data associated with a field operation of equipment in a geologic environment; apply a filter to the data where the filter includes, along a dimension, a single maximum positive value that decreases to a single minimum negative value that increases to approximately zero; and based on application of the filter to the data, issue a control signal to the equipment in the geologic environment. In such an example, the data can include 1-D time series data where the dimension corresponds to time. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 1 illustrates examples of equipment in a geologic environment;
FIG. 22 illustrates example plots;
FIG. 25 illustrates example components of a system and a networked system.

DETAILED DESCRIPTION

Figure 2:
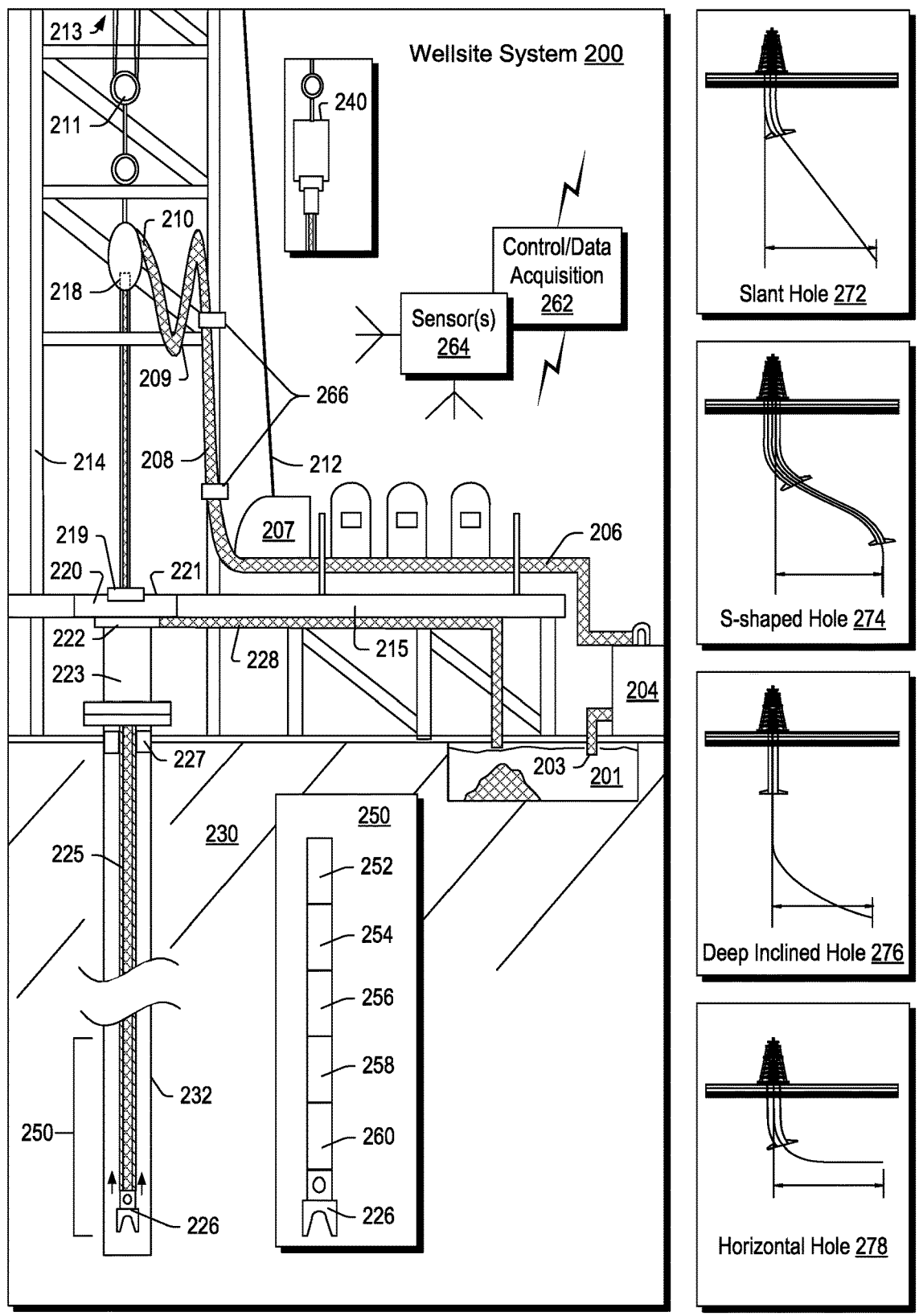
FIG. 2 illustrates an example of a system and examples of types of holes.

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Various operations can be performed in a field. For example, consider exploration as an initial phase in petroleum operations that includes generation of a prospect or play or both, and drilling of an exploration well or borehole. Appraisal, development and production phases may follow successful exploration.

A borehole may be referred to as a wellbore and can include an openhole portion or an uncased portion and/or may include a cased portion. A borehole may be defined by a bore wall that is composed of a rock that bounds the borehole.

As to a well or borehole, whether for one or more of exploration, sensing, production, injection or other operation(s), it can be planned. Such a process may be referred to generally as well planning, a process by which a path can be mapped in a geologic environment. Such a path may be referred to as a trajectory, which can include coordinates in a three-dimensional coordinate system where a measure along the trajectory may be a measured depth, a total vertical depth or another type of measure. During drilling, wireline investigations, etc., equipment may be moved into and/or out of a well or borehole. Such operations can occur over time and may differ with respect to time. A planning process may call for performing various operations, which may be serial, parallel, serial and parallel, etc.

As an example, a well plan can be generated based at least in part on imposed constraints and known information. As an example, a well plan may be provided to a well owner, approved, and then implemented by a drilling service provider (e.g., a directional driller or "DD"). In such an example, a rig may be used to drill, for example, according to a well plan. During a period of time during which a well plan is implemented, a rig may transition from one state to another state, which may be referred to as rigstates. As an example, a state may be a drilling state or may be a state where drilling into a formation (e.g., rock) is not occurring (e.g., an idle state, a tripping-in state, a tripping-out state, etc.).

As an example, a well design system can account for one or more capabilities of a drilling system or drilling systems that may be utilized at a wellsite. As an example, a drilling engineer may be called upon to take such capabilities into account, for example, as one or more of various designs and specifications are created. As an example, a state such as a rigstate may correspond to a capability, for example, while the capability is being utilized.

As an example, a well design system, which may be a well planning system, may take into account automation. For example, where a wellsite includes wellsite equipment that can be automated, for example, via a local and/or a remote automation command, a well plan may be generated in digital form that can be utilized in a well drilling system where at least some amount of automation is possible and desired. For example, a digital well plan can be accessible by a well drilling system where information in the digital well plan can be utilized via one or more automation mechanisms of the well drilling system to automate one or more operations at a wellsite.

As an example, one or more operating procedure specifications (e.g., standard operating procedures (SOPs) or other specified operation procedures) can define what operations are to occur and, for example, how those operations are to occur. An operation can include, for example, physically moving a drillstring in a bore, which may be to further drill the bore (e.g., borehole), to trip out the drillstring, to trip in the drillstring, etc. Moving a drillstring in a bore can include rotating one or more components of the drillstring (e.g., consider rotating a drill bit) and/or translating the drillstring. In various examples, one or more sensors can measure weight of a drillstring, which may be a weight on bit (WOB) measurement. In various examples, one or more sensors can measure rotation of a drillstring or component thereof. In various examples, one or more of torque, vibration, fluid flow, pressure, temperature, etc., may be measured by one or more corresponding sensors, directly and/or indirectly, additionally or alternatively to one or more other measurements. In various examples, measurements can be acquired and utilized to determine one or more of actions and conditions, as may be specified in one or more operating procedure specifications, which may be or include one or more standard operation procedures (SOPs).

As an example, states such as rigstates may be utilized in planning, implementation, diagnostics, automation, etc. For example, state information may be acquired and stored and/or analyzed. In such an example, analysis of state information may allow for making determinations as to whether a plan is being adequately followed, equipment is operating as expected, etc.

Various examples of types of environments, various examples of types of equipment and various examples of types of methods, operations, etc., are described below. Various examples of state systems, state system methods, etc. are also described, which may be utilized in one or more of the environments, for one or more types of equipment, for one or more types of methods, operations, etc. As an example, a control system may be utilized to control one or more operations performed in a field (e.g., field operation(s)). As an example, a control system may be a state-based controller, where, for example, a state can be determined based on acquired data, which can include one-dimensional (1-D) data, which may be time series data or depth series data or 1-D data with respect to another measure. Some examples of 1-D time series data include block position of a traveling block of a rig during one or more operations (e.g., drilling, tripping in, tripping out, etc.) and hook load of a hook of a rig during one or more operations (e.g., drilling, tripping in, tripping out, etc.). As an example, one or more wireline operations may acquire 1-D using one or more tools positionable downhole and/or one or more tools positioned at the surface (e.g., a wireline vehicle, a wireline rig, etc.). Various types of series data may be acquired from one or more tools at the surface and/or one or more tools below the surface. In various examples, such data can be filtered, for example, for use in a system, which may be a dynamic field operations system. Such a system can include one or more interfaces that can receive data, one or more filters to filter received data and, for example, one or more interfaces that can output one or more signals based at least in part on filtering of data.

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrick person may be a rig crew member that works on a platform attached to a derrick or a mast. A derrick can include a landing on which a derrick person may stand. As an example, such a landing may be about 10 meters or more above a rig floor. In an operation referred to as trip out of the hole (TOH), a derrick person may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrick person controls the machinery rather than physically handling the pipe.

As an example, a trip may refer to the act of pulling equipment from a bore and/or placing equipment in a bore. As an example, equipment may include a drillstring that can be pulled out of the hole and/or place or replaced in the hole. As an example, a pipe trip may be performed where a drill bit has dulled or has otherwise ceased to drill efficiently and is to be replaced.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end.

As an example, the drillstring assembly 250 may be a bottom hole assembly (BHA).

The wellsite system 200 can provide for operation of the drillstring 225 and other operations. As shown, the wellsite system 200 includes the platform 215 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", the can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Tex.) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

Figure 3:
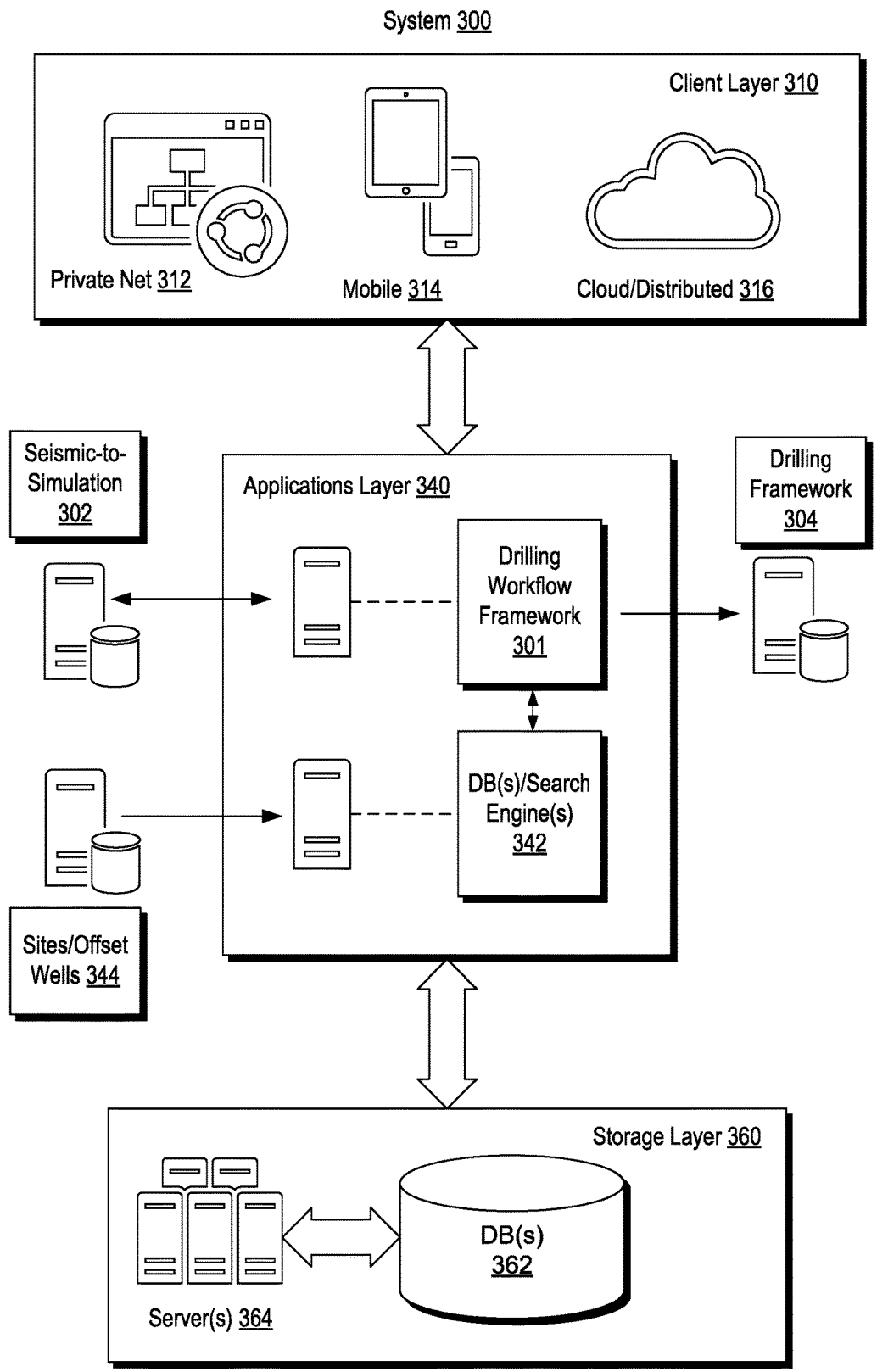
FIG. 3 illustrates an example of a system.

FIG. 3 shows an example of a system 300 that includes a drilling workflow framework 301, a seismic-to-simulation framework 302, a drilling framework 304, a client layer 310, an applications layer 340 and a storage layer 360. As shown the client layer 310 can be in communication with the applications layer 340 and the applications layer 340 can be in communication with the storage layer 360.

The client layer 310 can include features that allow for access and interactions via one or more private networks 312, one or more mobile platforms and/or mobile networks 314 and via the "cloud" 316, which may be considered to include distributed equipment that forms a network such as a network of networks.

In the example of FIG. 3, the applications layer 340 includes the drilling workflow framework 301. The applications layer 340 also includes a database management component 342 that includes one or more search engines modules.

As an example, the database management component 342 can include one or more search engine modules that provide for searching one or more information that may be stored in one or more data repositories. As an example, the STUDIO E&P™ knowledge environment (Schlumberger Ltd., Houston, Tex.) includes STUDIO FIND™ search functionality, which provides a search engine. The STUDIO FIND™ search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND™ search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more modules may optionally be implemented within a framework or, for example, in a manner operatively coupled to a framework (e.g., as an add-on, a plug-in, etc.). As an example, a module for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 3, the applications layer 340 can include communicating with one or more resources such as, for example, the seismic-to-simulation framework 302, the drilling framework 304 and/or one or more sites, which may be or include one or more offset wellsites. As an example, the applications layer 340 may be implemented for a particular wellsite where information can be processed as part of a workflow for operations such as, for example, operations performed, being performed and/or to be performed at the particular wellsite. As an example, an operation may involve directional drilling, for example, via geosteering.

In the example of FIG. 3, the storage layer 360 can include various types of data, information, etc., which may be stored in one or more databases 362. As an example, one or more servers 364 may provide for management, access, etc., to data, information, etc., stored in the one or more databases 462. As an example, the database management component 342 may provide for searching as to data, information, etc., stored in the one or more databases 362.

As an example, the database management component 342 may include features for indexing, etc. As an example, information may be indexed at least in part with respect to wellsite. For example, where the applications layer 440 is implemented to perform one or more workflows associated with a particular wellsite, data, information, etc., associated with that particular wellsite may be indexed based at least in part on the wellsite being an index parameter (e.g., a search parameter).

As an example, the system 300 of FIG. 3 may be implemented to perform one or more portions of one or more workflows associated with the system 200 of FIG. 2. As an example, the drilling workflow framework 301 may interact with a technical data framework and the drilling framework 304 before, during and/or after performance of one or more drilling operations. In such an example, the one or more drilling operations may be performed in a geologic environment (see, e.g., the environment 150 of FIG. 1) using one or more types of equipment (see, e.g., equipment of FIGS. 1 and 2).

As an example, an architecture utilized in a system such as, for example, the system 300 may include features of the AZURE™ architecture (Microsoft Corporation, Redmond, Wash.). As an example, a cloud portal block can include one or more features of an AZURE™ portal that can manage, mediate, etc. access to one or more services, data, connections, networks, devices, etc.

As an example, the system 300 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Figure 4:
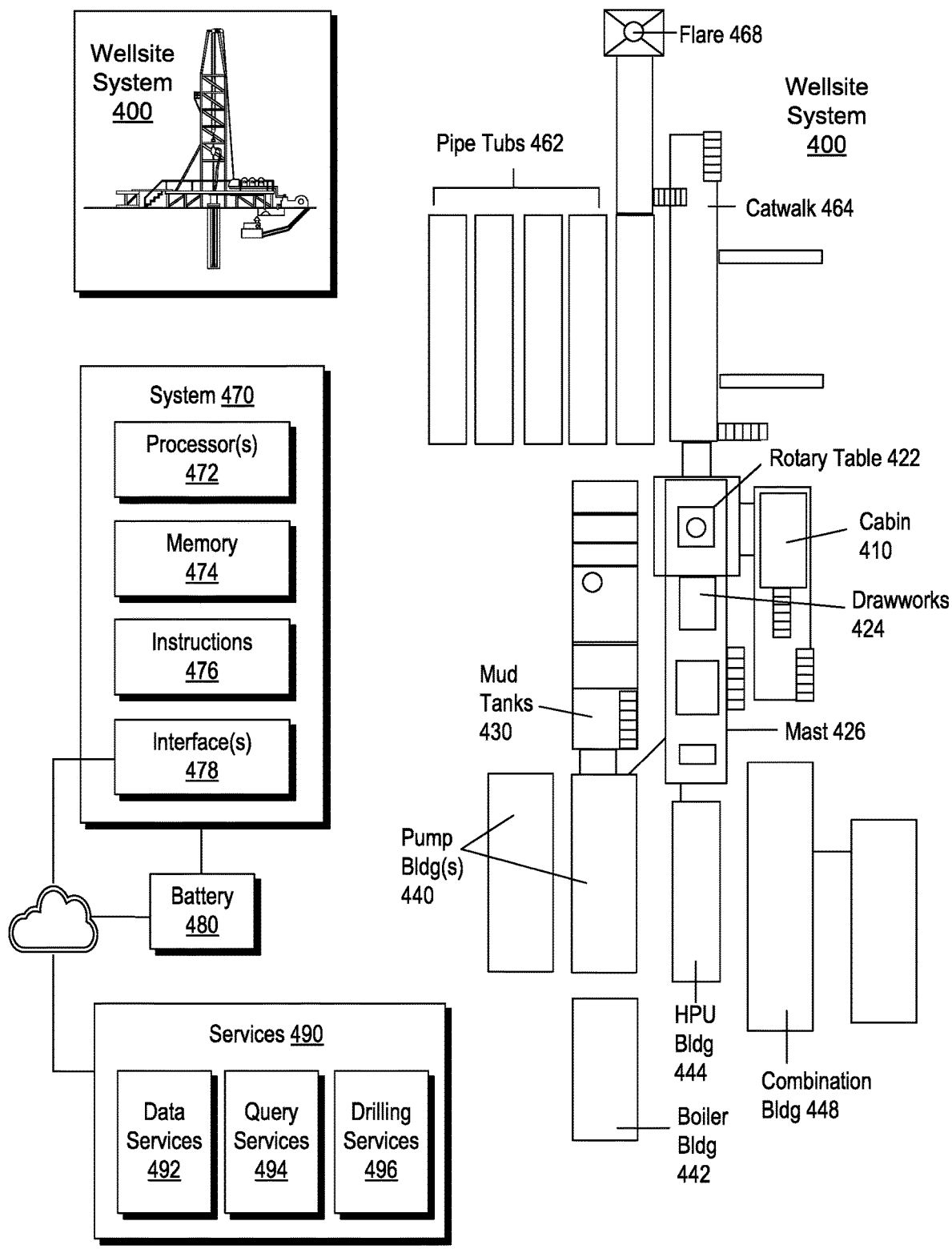
FIG. 4 illustrates an example of a system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

As an example, a system such as, for example, the system 300 of FIG. 3 may be utilized to perform a workflow. Such a system may be distributed and allow for collaborative workflow interactions and may be considered to be a platform (e.g., a framework for collaborative interactions, etc.).

As an example, a workflow can commence with an evaluation stage, which may include a geological service provider evaluating a formation. As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory, which may involve execution of one or more G&G software packages. Examples of such software packages include the PETREL® framework. As an example, a G&G service provider may determine a well trajectory or a section thereof, based on, for example, one or more model(s) provided by a formation evaluation, and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design. Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory. In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like. As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters. As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review. As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

Figure 5:
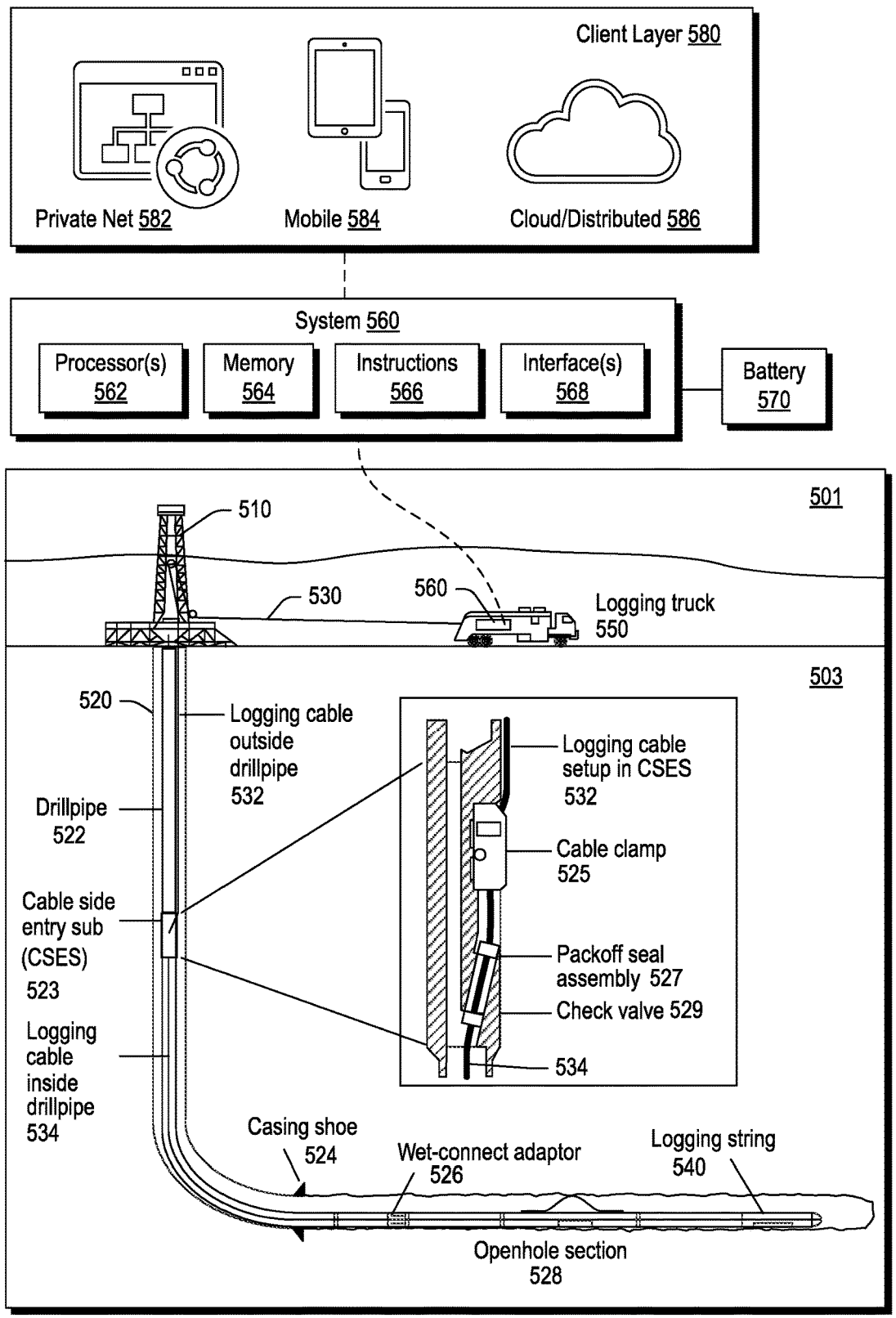
FIG. 5 illustrates an example of a system.

FIG. 5 shows an example of an environment 501 that includes a subterranean portion 503 where a rig 510 is positioned at a surface location above a bore 520. In the example of FIG. 5, various wirelines services equipment can be operated to perform one or more wirelines services including, for example, acquisition of data from one or more positions within the bore 520.

In the example of FIG. 5, the bore 520 includes drillpipe 522, a casing shoe, a cable side entry sub (CSES) 523, a wet-connector adaptor 526 and an openhole section 528. As an example, the bore 520 can be a vertical bore or a deviated bore where one or more portions of the bore may be vertical and one or more portions of the bore may be deviated, including substantially horizontal.

In the example of FIG. 5, the CSES 523 includes a cable clamp 525, a packoff seal assembly 527 and a check valve 529. These components can provide for insertion of a logging cable 530 that includes a portion 532 that runs outside the drillpipe 522 to be inserted into the drillpipe 522 such that at least a portion 534 of the logging cable runs inside the drillpipe 522. In the example of FIG. 5, the logging cable 530 runs past the wet-connect adaptor 526 and into the openhole section 528 to a logging string 540.

As shown in the example of FIG. 5, a logging truck 550 (e.g., a wirelines services vehicle) can deploy the wireline 530 under control of a system 560. As shown in the example of FIG. 5, the system 560 can include one or more processors 562, memory 564 operatively coupled to at least one of the one or more processors 562, instructions 566 that can be, for example, stored in the memory 564, and one or more interfaces 568. As an example, the system 560 can include one or more processor-readable media that include processor-executable instructions executable by at least one of the one or more processors 562 to cause the system 560 to control one or more aspects of equipment of the logging string 540 and/or the logging truck 550. In such an example, the memory 564 can be or include the one or more processor-readable media where the processor-executable instructions can be or include instructions. As an example, a processor-readable medium can be a computer-readable storage medium that is not a signal and that is not a carrier wave.

FIG. 5 also shows a battery 570 that may be operatively coupled to the system 560, for example, to power the system 560. As an example, the battery 570 may be a back-up battery that operates when another power supply is unavailable for powering the system 560 (e.g., via a generator of the wirelines truck 550, a separate generator, a power line, etc.). As an example, the battery 570 may be operatively coupled to a network, which may be a cloud network. As an example, the battery 570 can include smart battery circuitry and may be operatively coupled to one or more pieces of equipment via a SMBus or other type of bus.

As an example, the system 560 can be operatively coupled to a client layer 580. In the example of FIG. 5, the client layer 580 can include features that allow for access and interactions via one or more private networks 582, one or more mobile platforms and/or mobile networks 584 and via the "cloud" 586, which may be considered to include distributed equipment that forms a network such as a network of networks. As an example, the system 560 can include circuitry to establish a plurality of connections (e.g., sessions). As an example, connections may be via one or more types of networks. As an example, connections may be client-server types of connections where the system 560 operates as a server in a client-server architecture. For example, clients may log-in to the system 560 where multiple clients may be handled, optionally simultaneously.

Figure 6:
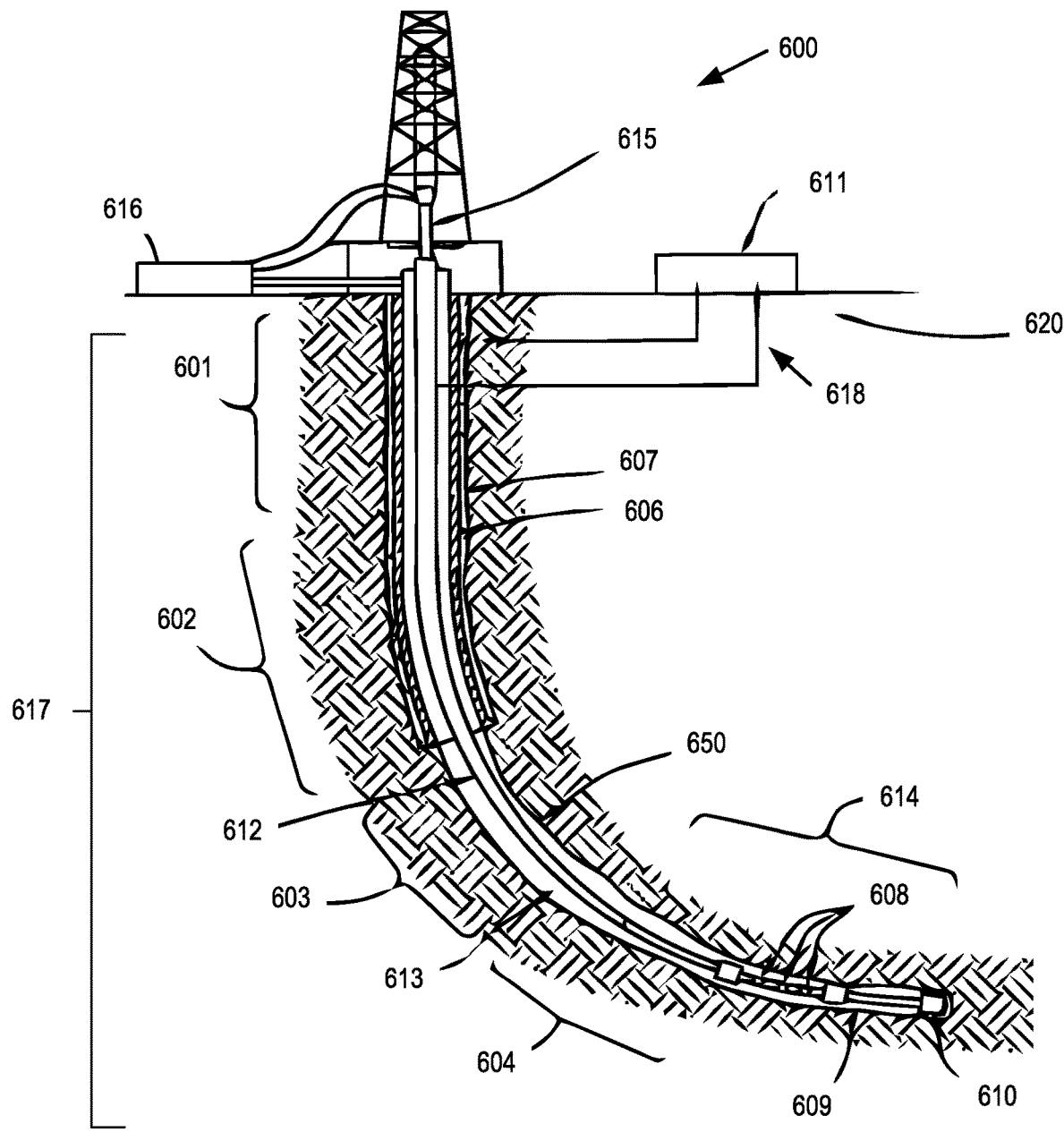
FIG. 6 illustrates an example of a system.

FIG. 6 shows a schematic diagram depicting an example of a drilling operation of a directional well in multiple sections. The drilling operation depicted in FIG. 6 includes a wellsite drilling system 600 and a field management tool 620 for managing various operations associated with drilling a bore hole 650 of a directional well 617. The wellsite drilling system 600 includes various components (e.g., drillstring 612, annulus 613, bottom hole assembly (BHA) 614, kelly 615, mud pit 616, etc.). As shown in the example of FIG. 6, a target reservoir may be located away from (as opposed to directly under) the surface location of the well 617. In such an example, special tools or techniques may be used to ensure that the path along the bore hole 650 reaches the particular location of the target reservoir.

As an example, the BHA 614 may include sensors 608, a rotary steerable system 609, and a bit 610 to direct the drilling toward the target guided by a pre-determined survey program for measuring location details in the well. Furthermore, the subterranean formation through which the directional well 617 is drilled may include multiple layers (not shown) with varying compositions, geophysical characteristics, and geological conditions. Both the drilling planning during the well design stage and the actual drilling according to the drilling plan in the drilling stage may be performed in multiple sections (e.g., sections 601, 602, 603 and 604) corresponding to the multiple layers in the subterranean formation. For example, certain sections (e.g., sections 601 and 602) may use cement 607 reinforced casing 606 due to the particular formation compositions, geophysical characteristics, and geological conditions.

In the example of FIG. 6, a surface unit 611 may be operatively linked to the wellsite drilling system 600 and the field management tool 620 via communication links 618. The surface unit 611 may be configured with functionalities to control and monitor the drilling activities by sections in real-time via the communication links 618. The field management tool 620 may be configured with functionalities to store oilfield data (e.g., historical data, actual data, surface data, subsurface data, equipment data, geological data, geophysical data, target data, anti-target data, etc.) and determine relevant factors for configuring a drilling model and generating a drilling plan. The oilfield data, the drilling model, and the drilling plan may be transmitted via the communication link 618 according to a drilling operation workflow. The communication links 618 may include a communication subassembly.

During various operations at a wellsite (see, e.g., FIGS. 1, 2, 4, 5 and 6), data can be acquired for analysis and/or monitoring of one or more operations. Such data may include, for example, subterranean formation, equipment, historical and/or other data. Static data can relate to, for example, formation structure and geological stratigraphy that define the geological structures of the subterranean formation. Static data may also include data about a bore, such as inside diameters, outside diameters, and depths. Dynamic data can relate to, for example, fluids flowing through the geologic structures of the subterranean formation over time. The dynamic data may include, for example, pressures, fluid compositions (e.g. gas oil ratio, water cut, and/or other fluid compositional information), and states of various equipment, and other information.

The static and dynamic data collected via a bore, a formation, equipment, etc. may be used to create and/or update a three dimensional model of one or more subsurface formations. As an example, static and dynamic data from one or more other bores, fields, etc. may be used to create and/or update a three dimensional model. As an example, hardware sensors, core sampling, and well logging techniques may be used to collect data. As an example, static measurements may be gathered using downhole measurements, such as core sampling and well logging techniques. Well logging involves deployment of a downhole tool into the wellbore to collect various downhole measurements, such as density, resistivity, etc., at various depths. Such well logging may be performed using, for example, a drilling tool and/or a wireline tool, or sensors located on downhole production equipment. Once a well is formed and completed, depending on the purpose of the well (e.g., injection and/or production), fluid may flow to the surface (e.g., and/or from the surface) using tubing and other completion equipment. As fluid passes, various dynamic measurements, such as fluid flow rates, pressure, and composition may be monitored. These parameters may be used to determine various characteristics of a subterranean formation, downhole equipment, downhole operations, etc.

As an example, a system can include a framework that can acquire data such as, for example, real-time data associated with one or more operations such as, for example, a drilling operation or drilling operations. As an example, consider the PERFORM™ toolkit framework (Schlumberger Limited, Houston, Tex.).

As an example, a service can be or include one or more of OPTIDRILL™, OPTILOG™ and/or other services marketed by Schlumberger Limited, Houston, Tex.

The OPTIDRILL™ technology can help to manage downhole conditions and BHA dynamics as a real-time drilling intelligence service. The service can incorporate a rigsite display (e.g., a wellsite display) of integrated downhole and surface data that provides actionable information to mitigate risk and increase efficiency. As an example, such data may be stored, for example, to a database system (e.g., consider a database system associated with the STUDIO™ framework).

The OPTILOG™ technology can help to evaluate drilling system performance with single- or multiple-location measurements of drilling dynamics and internal temperature from a recorder. As an example, post-run data can be analyzed to provide input for future well planning.

As an example, information from a drill bit database may be accessed and utilized. For example, consider information from Smith Bits (Schlumberger Limited, Houston, Tex.), which may include information from various operations (e.g., drilling operations) as associated with various drill bits, drilling conditions, formation types, etc.

As an example, one or more QTRAC services (Schlumberger Limited, Houston Tex.) may be provided for one or more wellsite operations. In such an example, data may be acquired and stored where such data can include time series data that may be received and analyzed, etc.

As an example, one or more M-I SWACO™ services (M-I L.L.C., Houston, Tex.) may be provided for one or more wellsite operations. For example, consider services for value-added completion and reservoir drill-in fluids, additives, cleanup tools, and engineering. In such an example, data may be acquired and stored where such data can include time series data that may be received and analyzed, etc.

As an example, one or more ONE-TRAX™ services (e.g., via the ONE-TRAX software platform, M-I L.L.C., Houston, Tex.) may be provided for one or more wellsite operations. In such an example, data may be acquired and stored where such data can include time series data that may be received and analyzed, etc.

As to drilling, a measurement may be weight on bit, which may be acquired via one or more pieces of equipment (e.g., surface and/or subsurface). Actual weight on bit (WOB) can be provided in part by drill collars, which are thick-walled tubular pieces machined from solid bars of steel (e.g., plain carbon steel, etc.) and/or nonmagnetic nickel-copper alloy or other nonmagnetic premium alloys. Gravity can act on the large mass of the drill collars to provide downward force for the bits to efficiently break rock. To accurately control the amount of force applied to the bit, a driller and/or a control system can monitor surface weight measured via one or more sensors while the bit is just off the bottom of a wellbore, where a drillstring (and the drill bit) is slowly and carefully lowered until it touches bottom and as the driller continues to lower the top of the drillstring such that more and more weight is applied to the bit, and correspondingly less weight is measured as hanging at the surface. As an example, if the surface measurement shows 20,000 pounds (e.g., 9080 kg) less weight than with the bit off bottom, then a control system can determine 20,000 pounds (e.g., 9080 kg force) force on the bit (e.g., in a vertical hole). Various downhole MWD sensors can measure WOB, which may be more accurate than surface measurements. As an example, a MWD sensor may measure WOB and transmit the measured WOB data to the surface (e.g., a surface control system, a surface controller, etc.). As may be appreciated, WOB is a variable that can change during drilling operations and may be utilized in a time series approach to determine types of actions, degree of actions, success of actions, failure of actions, etc.

Various operations can be performed in a manner that utilizes one or more pieces of equipment that move. For example, consider a block, which may be a traveling block. A traveling block can include a set of sheaves that move up and down in a derrick. In such an example, wire rope can be threaded through the set of sheaves that is threaded (or "reeved") back to stationary crown block(s) located on the top of the derrick. Such a pulley system can provide mechanical advantage to the action of the wire rope line, enabling heavy loads (e.g., drillstring, casing and liners) to be lifted out of or lowered into a bore. Such operations may include tripping in operations or tripping out operations of one or more pieces of equipment with respect to a borehole, a well, etc.

Figure 7:
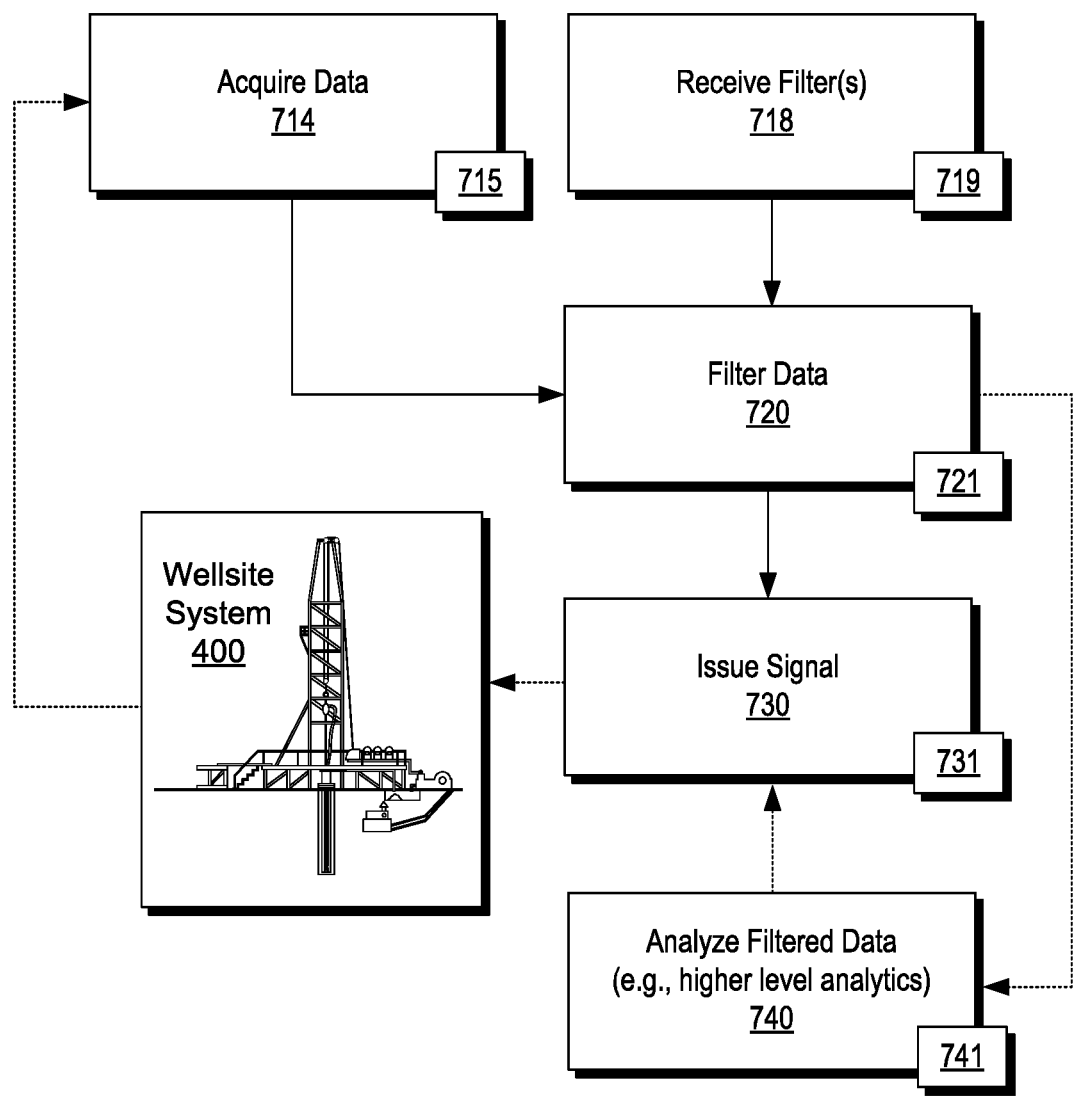
FIG. 7 illustrates an example of a method.

FIG. 7 shows an example of a method 700 that includes an acquisition block 714 for acquiring data associated with a field operation of equipment in a geologic environment; a filter block 720 for filtering the data using a filter where the filter includes, along a dimension, a single maximum positive value that decreases to a single minimum negative value that increases to approximately zero (e.g., asymptotically to approximately zero or that increases to precisely zero or a null value); and an issuance block 730 for, based on the filtering, issuing a control signal to the equipment in the geologic environment. In the example of FIG. 7, a reception block 718 can provide for receiving one or more filters, which may be applied by the filter block 720.

As shown, the method 700 may include an analysis block 740 for analyzing filtered data as generated through applying the filter to at least a portion of the data. In such an example, the analysis block 740 can include analyzing via higher level analytics that, for example, a trigger approach. For example, the filter block 720 can be applied in a manner that causes generation of a trigger that calls for issuance of the control signal via the issuance block 730. In such an example, the filter block 720 can apply the filter in real-time to time series data to detect one or more features of the time series data that indicate a physical behavior of one or more pieces of equipment, a formation, fluid, etc. In such an example, the detection can trigger issuance of a control signal. In such an approach, one or more criteria may be utilized to compare filter results (e.g., filtered data, derivative(s), etc.) to determine whether issuance of a control signal is to occur (e.g., triggered, etc.).

In the example of FIG. 7, the wellsite system 400 is illustrated as an example of some types of equipment that may be utilized to perform one or more operations in a geologic environment. As an example, the method 700 of FIG. 7 may be implemented using the system 470 of FIG. 4 and/or the system 560 of FIG. 5.

The method 700 is shown as including various computer-readable storage medium (CRM) blocks 715, 719, 721, 731 and 741 that can include processor-executable instructions that can instruct a computing system, which can be a control system, to perform one or more of the actions described with respect to the method 700.

As an example, a method can enhance 1-D series data, which may be time series data, depth series data or another type of 1-D series data. As an example, block position may be 1-D time series data or, for example, 1-D depth series data where the position of the block is represented with respect to depth of equipment in a borehole such as depth of a drill bit, which may be drilling, lifting, dropping, tripping-in or tripping out.

As an example, wireline data can include 1-D series data, as to sensed information by one or more wireline where such information is sensed with respect to time and/or with respect to depth. As an example, a wireline and/or a drillstring can be tracked with respect to depth, which may be measured depth and/or total vertical depth.

As equipment moves, it can move with a velocity in a particular direction or, for example, velocity components in more than one direction. As equipment moves, it can move with acceleration in one or more directions. As an example, equipment movement may be affected by gravity. For example, a manner in which equipment moves may differ depending on the orientation of the equipment with respect to gravity, which may, for example, be determined in part by a geometry of a borehole (e.g., orientation of a borehole with respect to gravity). Various other forces that can be experienced during field operations can include one or more of friction forces, side forces, buoyancy forces, etc.

As an example, a piece of equipment such as a block can be fit with an accelerometer, which may be a one or more axis accelerometer. As an example, block position with respect to time as 1-D time series data may be processed to derive velocity information and/or acceleration information. In such an example, derived information may be compared to sensed information. For example, consider comparing a derived acceleration value to a sensed acceleration value. As an example, in various field operations, block acceleration can have an affect on hook load. For example, where acceleration is in one direction, hook load may increase and where acceleration is in an opposite direction, hook load may decrease; while for approximately zero acceleration (e.g., constant velocity), hook load may remain relatively constant.

As an example, acceleration values may be compared and utilized to determine one or more conditions. For example, an acceleration derived from block position with respect to time may not indicate vibration in a lateral direction (e.g., radially outwardly, etc.) whereas an accelerometer reading may indicate acceleration in a lateral direction. Real-time derived and measured values may be compared, for example, to facilitate control and/or diagnostics as to how equipment may be behaving and/or responding to one or more conditions.

As an example, a method can include applying a filter to 1-D series data. In such an example, the filter can provide for generating real-time information such as one or more derivatives of the 1-D series data. As an example, an appropriate real-time filter can include, along a dimension, a single maximum positive value that decreases to a single minimum negative value that increases to approximately zero (e.g., in an asymptotic manner, etc.). Such a filter can be applied to various types of 1-D series data. As an example of such a filter, a zero-lag Difference of Gaussian filter (ZL-DoG) includes, along a dimension, a single maximum positive value that decreases to a single minimum negative value that increases to approximately zero (e.g., in an asymptotic manner, etc.). Such a filter can be applied to various types of 1-D series data.

In the realm of filters that can be used to enhance edges in a 2-D image, such filters include Difference of Gaussians (DoG), Laplacian of Gaussians (LoG), and Canny edge detector. Such filters are applied to pixel value in a 2-D spatial domain (e.g., as in a pixel array in X and Y directions). For 2-D images, the concept of "lag" as in a temporal delay (e.g., as to moving equipment, etc.) is lacking.

As an example, a ZL-DoG filter can be generated and applied in a manner that minimizes lag such as temporal lag, or lag associated with movement as in depth series data. A ZL-DoG filter can be applied to real-world time-series data in one or more field operations, such as block position (BPOS) and hook load (HKLD), to estimate velocity or other derivatives, to find peaks or troughs (valleys), and/or to characterize one or more other signal features.

As an example, a ZL-DoG filter may be implemented in a manner that can include a single parameter and may provide for fast performance such that it allows for characterization of 1-D series data in real-time (e.g., time-series and/or depth-series). In such an example, the single parameter can be a window, such as a time window value (e.g., as to time or number of samples, as sampled at a sampling rate).

Various types of data associated with field operations can be 1-D series data. For example, consider data as to one or more of a drilling system, downhole states, formation attributes, and surface mechanics being measured as single or multi-channel time series data.

Figure 8:
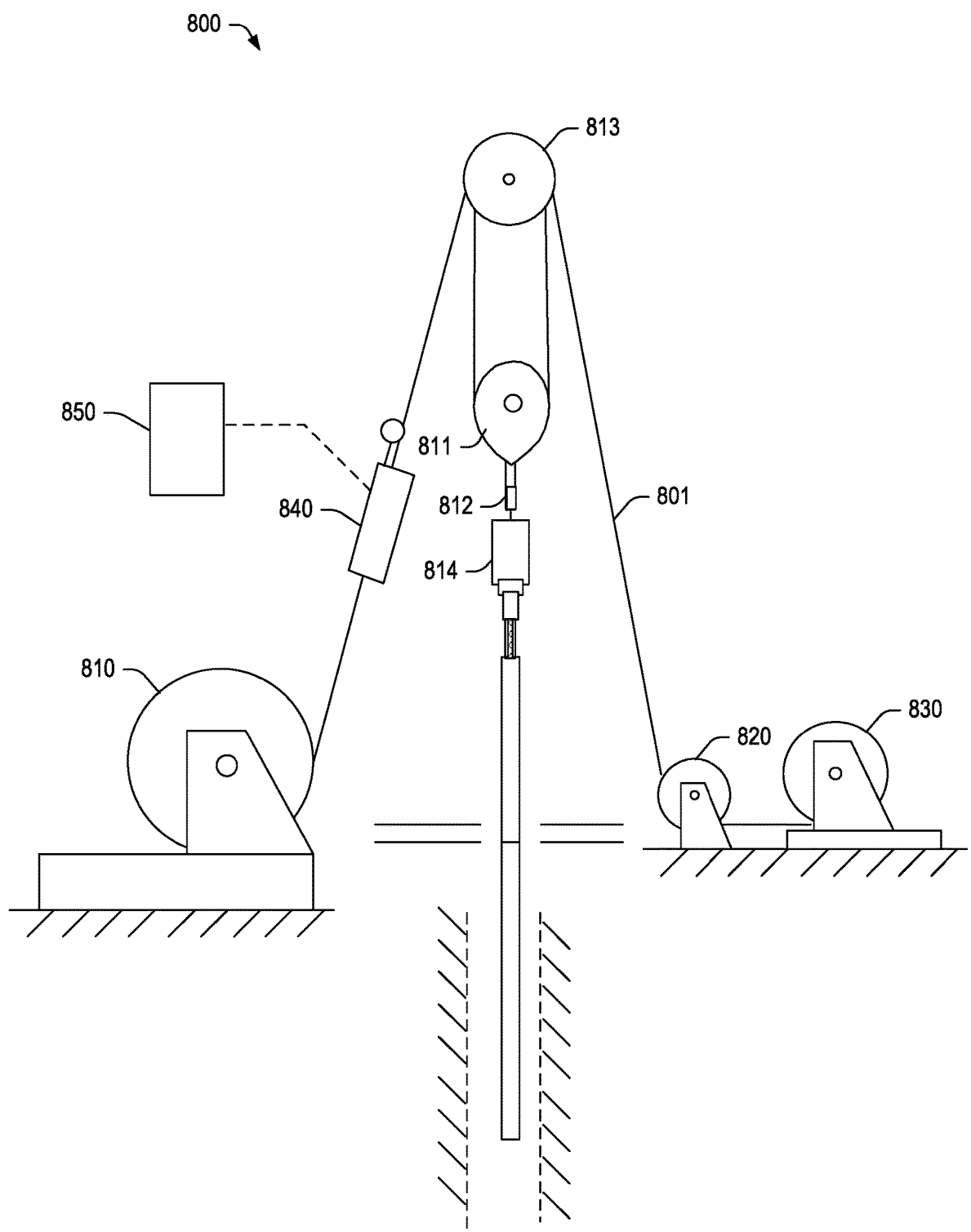
FIG. 8 illustrates an example of a system.

FIG. 8 shows an example of various components of a hoisting system 800, which includes a cable 801, drawworks 810, a traveling block 811, a hook 812, a crown block 813, a top drive 814, a cable deadline tiedown anchor 820, a cable supply reel 830, one or more sensors 840 and circuitry 850 operatively coupled to the one or more sensors 840. In the example of FIG. 8, the hoisting system 800 can include various sensors, which may include one or more of load sensors, displacement sensors, accelerometers, etc. As an example, the cable deadline tiedown anchor 820 may be fit with a load cell (e.g., a load sensor).

The hoisting system 800 may be part of the wellsite system 200 of FIG. 2 or the wellsite system 400 of FIG. 4 or FIG. 7. In such a system, a measurement channel can be a block position measurement channel, referred to as BPOS, which provides measurements of a height of a traveling block, which may be defined about a deadpoint (e.g., zero point) and may have deviations from that deadpoint in positive and/or negative directions. For example, consider a traveling block that can move in a range of approximately −5 meters to +45 meters, for a total excursion of approximately 50 meters. In such an example, a rig height can be greater than approximately 50 meters (e.g., a crown block can be set at a height from the ground or rig floor in excess of approximately 50 meters). While various examples are given for land-based field operations (e.g., fixed, truck-based, etc.), various methods can apply for marine-based operations (e.g., vessel-based rigs, platform rigs, etc.).

BPOS is a type of real-time channel that reflects surface mechanical properties of a rig. Another example of a channel is hook load, which can be referred to as HKLD. HKLD can be a 1-D series measurement of the load of a hook. As to a derivative, a first derivative can be a load velocity and a second derivative can be a load acceleration. Such data channels can be utilized to infer and monitor various operations and/or conditions. In some examples, a rig may be represented as being in one or more states, which may be referred to as rig states.

As to the HKLD channel, it can help to detect if a rig is "in slips", while the BPOS channel can be a primary channel for depth tracking during drilling. For example, BPOS can be utilized to determine a measured depth in a geologic environment (e.g., a borehole being drilled, etc.). As to the condition or state "in slips", HKLD is at a much lower value than in the condition or state "out of slips".

The term slips refers to a device or assembly that can be used to grip a drillstring (e.g., drillcollar, drillpipe, etc.) in a relatively nondamaging manner and suspend it in a rotary table. Slips can include three or more steel wedges that are hinged together, forming a near circle around a drillpipe. On the drillpipe side (inside surface), the slips are fitted with replaceable, hardened tool steel teeth that embed slightly into the side of the pipe. The outsides of the slips are tapered to match the taper of the rotary table. After the rig crew places the slips around the drillpipe and in the rotary, a driller can control a rig to slowly lower the drillstring. As the teeth on the inside of the slips grip the pipe, the slips are pulled down. This downward force pulls the outer wedges down, providing a compressive force inward on the drillpipe and effectively locking components together. Then the rig crew can unscrew the upper portion of the drillstring (e.g., a kelly, saver sub, a joint or stand of pipe) while the lower part is suspended. After some other component is screwed onto the lower part of the drillstring, the driller raises the drillstring to unlock the gripping action of the slips, and a rig crew can remove the slips from the rotary.

A hookload sensor can be used to measure a weight of load on a drillstring and can be used to detect whether a drillstring is in-slips or out-of-slips. When the drill string is in-slips, motion from the blocks or motion compensator do not have an effect on the depth of a drill bit at the end of the drillstring (e.g., it will tend to remain stationary). Where movement of a traveling block is via a drawworks encoder (DWE), which can be mounted on a shaft of the drawworks, acquired DWE information (e.g., BPOS) does not augment the recorded drill bit depth. When a drillstring is out-of-slips (e.g., drilling ahead), DWE information (e.g., BPOS) can augment the recorded bit depth. The difference in hookload weight (HKLD) between in-slips and out-of-slips tends to be distinguishable. As to marine operations, heave of a vessel can affect bit depth whether a drillstring is in-slips or out-of-slips. As an example, a vessel can include one or more heave sensors, which may sense data that can be recorded as 1-D series data.

As to marine operations, a vessel may experience various types of motion, such as, for example, one or more of heave, sway and surge. Heave is a linear vertical (up/down) motion, sway is linear lateral (side-to-side or port-starboard) motion, and surge is linear longitudinal (front/back or bow/stern) motion imparted by maritime conditions. As an example, a vessel can include one or more heave sensors, one or more sway sensors and/or one or more surge sensors, each of which may sense data that can be recorded as 1-D series data.

As an example, BPOS alone, or combined with one or more other channels, can be used to detect whether a rig is "on bottom" drilling or "tripping", etc. An inferred state may be further consumed by one or more systems such as, for example, an automatic drilling control system, which may be a dynamic field operations system or a part thereof. In such an example, the conditions, operations, states, etc., as discerned from BPOS and/or other channel data may be predicates to making one or more drilling decisions, which may include one or more control decisions (e.g., of a controller that is operatively coupled to one or more pieces of field equipment, etc.).

Figure 9:
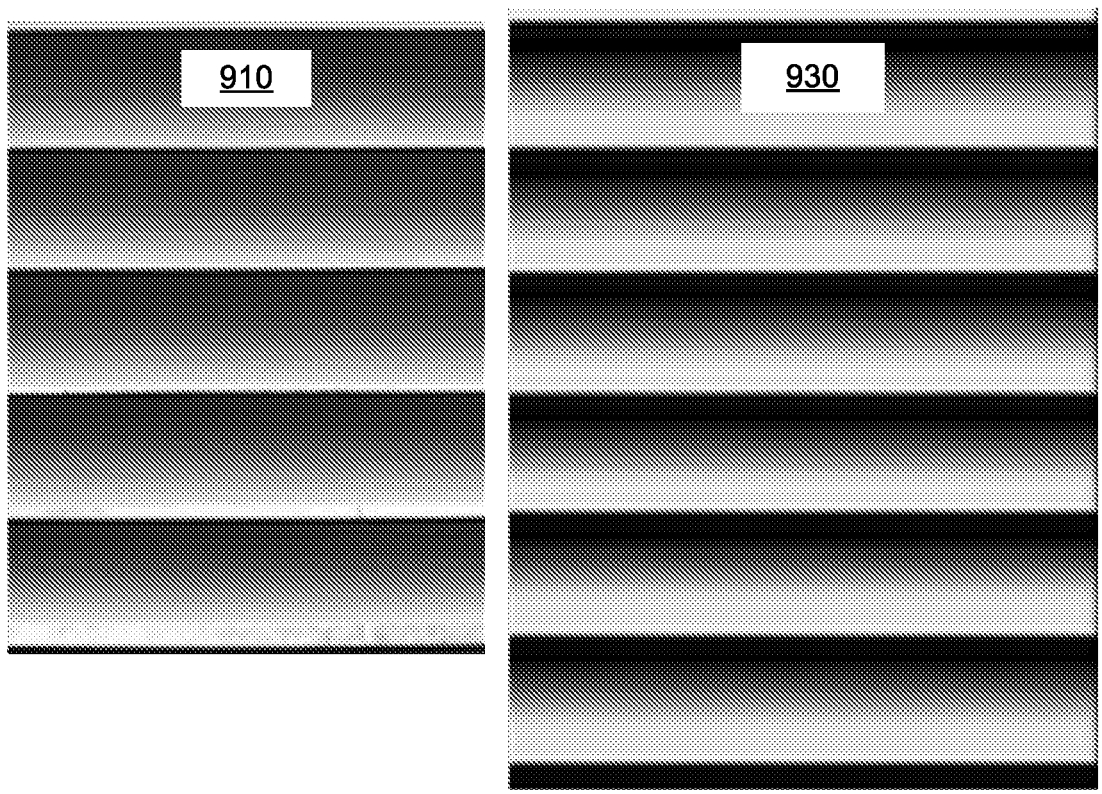
FIG. 9 illustrates an example of a real image and an example of a synthetic image.

FIG. 9 shows a photograph of blinds 910 and a synthetic image 930 generated by rendering data of BPOS channel data in two-dimensions such that information in the BPOS data appears in the image as features with edges (e.g., pixel intensity changes in a vertical direction of the horizontal and vertical image). Specifically, in the image 930, time is represented in the vertical direction (e.g., y-axis). Each BPOS value is converted to a pixel normalized in a certain grayscale and repeated along the horizontal axis (e.g., x-axis).

Figure 10:
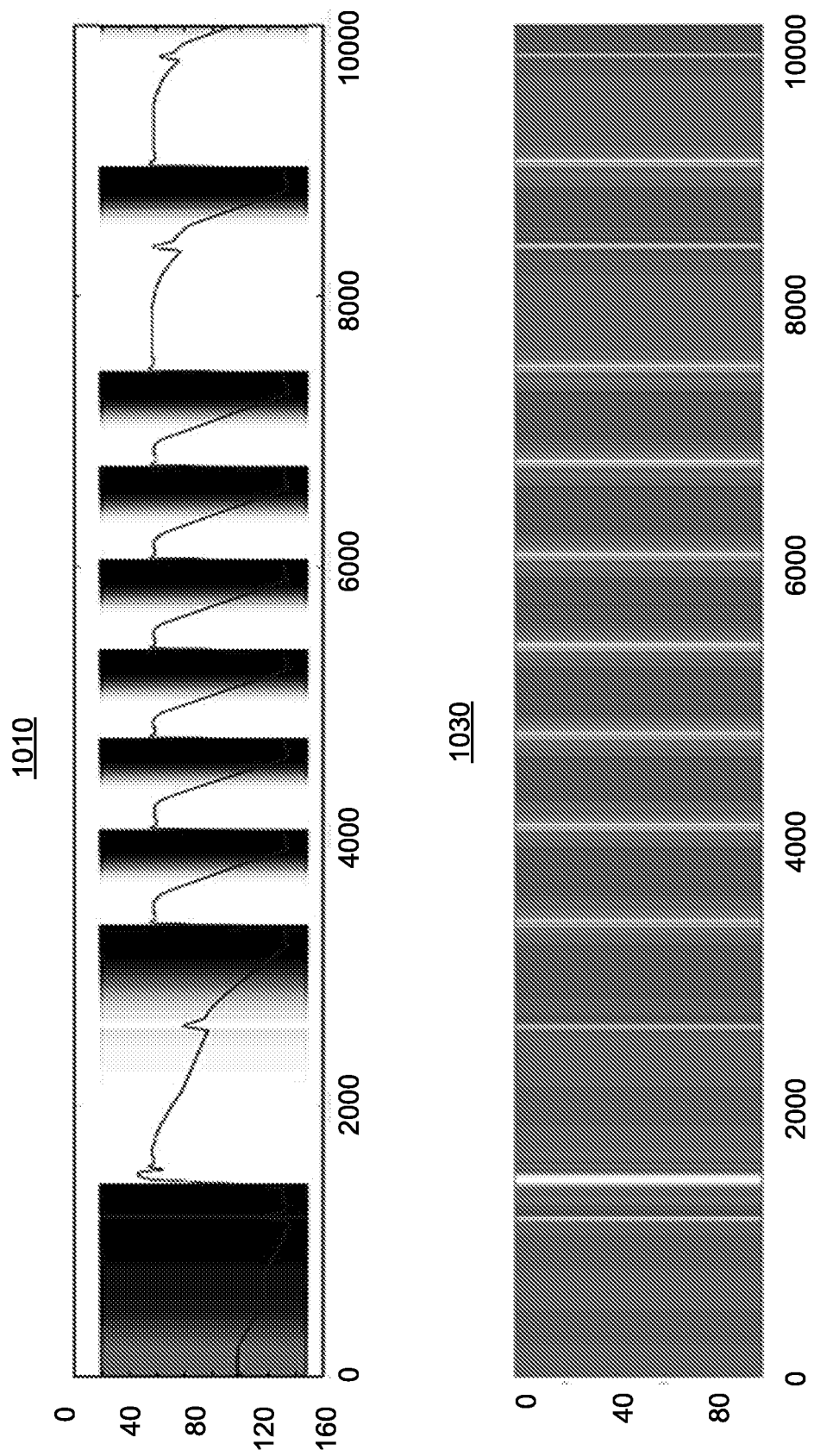
FIG. 10 illustrates examples of plots.

A filter can be applied to the images 910 and 930 where such a filter acts to detect edges. FIG. 10 shows plots 1010 and 1030 as results of the aforementioned ZL-DoG filter, which can enhance abrupt changes and suppress slow movements; noting that the image 930 is adapted from the plot 1010 of FIG. 10, with rotation of 90 degrees.

In FIG. 10, stands are shown as edges on the block position data (BPOS channel data). Specifically, the plot 1010 shows the time series data of block position and image in the background while the plot 1030 shows edges enhanced by using the ZL-DoG filter, which correlate with the stands and other features.

As shown in FIG. 10, the ZL-DoG filter can be utilized to characterize time series data. As an example, in a workflow, an enhanced signal and extracted properties from a filter response can be fed to one or more processes, for example, to further inference operations, conditions, etc., which may be part of one or more control loops of a control system. As an example, a higher level process can include machine learning, artificial intelligence, etc., which may train a model that can be utilized to model, detect, analyze, etc., various types of data of one or more operations (e.g., via a wellsite system, etc.).

An approach to calculating derivatives of discete time series data can involve using a differential quotient to approximate the derivative of function f using the equation below:

$$\frac{f(x+h) - f(x)}{h}$$

In such an approach, performance is dependent on choice of a step size parameter h. For example, a block velocity (BVEL) channel which may be derived through a state algorithm can compute velocity of BPOS by setting h to sample rate. However, such an approach tends to suffer from the noise in the signal and the lag in response. Other filters, such as finite difference approximators (e.g., 5- or 9-point stencil central difference), or Savitzky-Golay (SG) filter tend to be more stable to noise than the differential quotient since more points are used. Such methods estimate the derivative of a point in the middle of the time window, which means that such an approach takes as input data points from the future, or incurs a delay of half time window size. The response lag in such filters makes it difficult to apply them to real-time inference algorithms. Moreover, these filters smooth a series, so that abrupt changes in the data are suppressed.

In the image processing area, some edge filters can enhance an abrupt change in an image, for example, consider the Difference of Gaussians (DoG), the Laplacian of Gaussians (LoG), and the Canny edge detector. However, these filters are in the spatial domain, as explained above, and handle pixel values as in an two-dimensional array. Further, as explained below, such filters, if directly applied to 1-D time data in a temporal doman have lag. In other words, they can be unsuitable or impractical in situations where lag is undesirable and/or unacceptable. For example, if a controller is to operate quickly, lag can make the controller operate in a sub-optimal manner and, for example, may cause undesirable control dynamics (e.g., controller driven oscillations, additional controller tuning, etc.).

As mentioned, a filter can be a zero-lag Difference of Gaussian (ZL-DoG) filter. Such a filter can act to minimize delay while enhancing "edges" in series data. Such a filter can be applied to 1-D series data, optionally in real-time and optionally in a control environment (e.g., where a control can act on such data and/or one or more filtered results thereof). Such a filter can be applied to real time series data, BPOS and HKLD channels, to estimate their velocity or derivatives, peaks or troughs, and other signal features.

Figure 11:
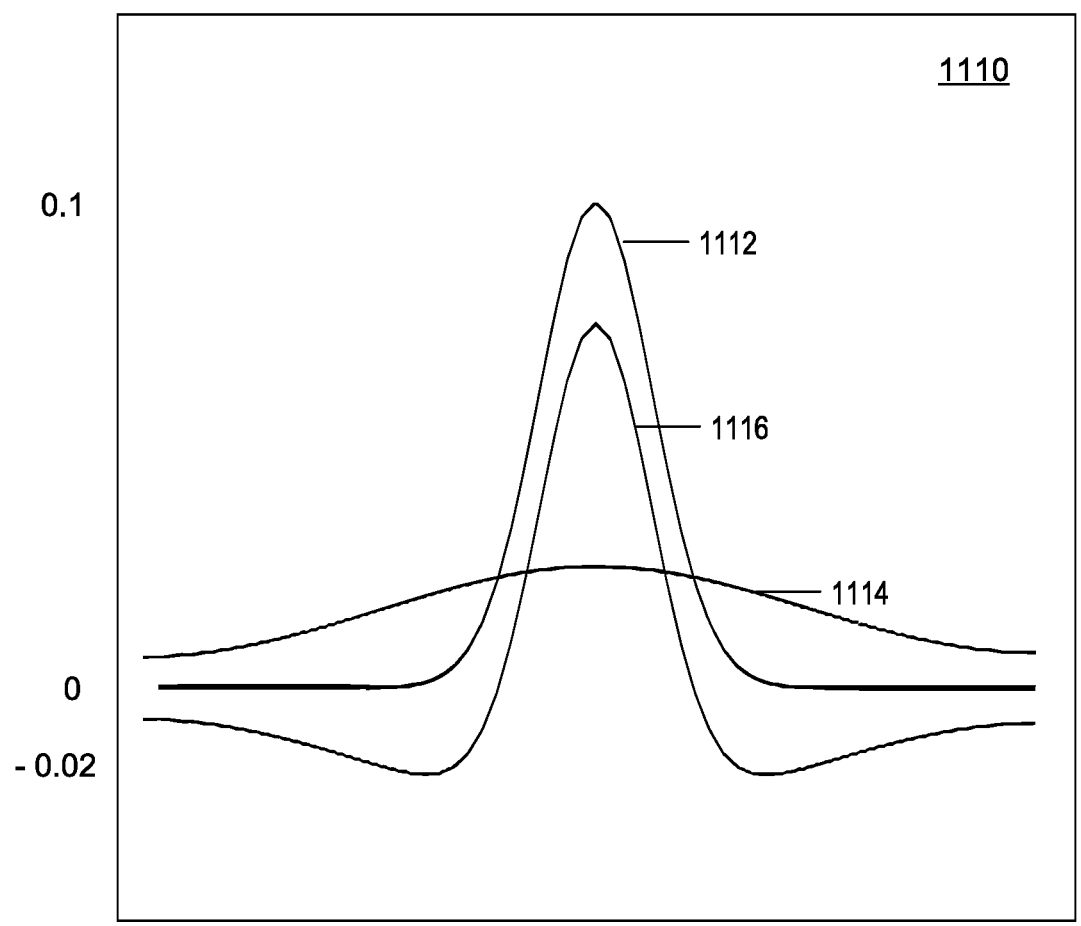
FIG. 11 illustrates an example plot.

FIG. 11 shows a series of distributions 1112, 1114 and 1116 associated with a DoG filter, which can be understood with respect to Equation 1. The distributions of FIG. 11 pertain to a human visual model of an eye (e.g., pupil, retina, etc.) (see, e.g., D. Marr and E. Hildreth. Theory of edge detection. Proc. R. Soc. Lond. B, 207:187-217, 1980, which is incorporated by reference herein).

In FIG. 11, a model of excitatory, or "on" center in the retina, with a positive Gaussian distribution 1112 (curve with greatest maximum in FIG. 11) has a small standard deviation ($\sigma_1$), while a model of inhibitory, or "off" center from the retina, with a negative Gaussian distribution 1114 (curve with lowest maximum in FIG. 11) has a larger standard deviation ($\sigma_2$). The third distribution 1116 is a difference of the Gaussians distributions 1112 and 1114. More specifically, in FIG. 11, a DoG filter can be shaped as shown by the DoG distribution 1116 with a window size of, for example, 64 samples, in a spatial domain where the greatest maximum distribution 1112 is for the excitatory Gaussian (stdev=4) and the lowest maximum distribution 1114 is for the inhibitory Gaussian (stdev=16). In a frequency domain, a DoG filter enhances edges in a certain frequency band. Equation 1 appears below:

$$DoG(x) = G_p(x) - G_n(x), \quad (1)$$

where the function $G_p(x)$ and $G_n(x)$ are Gaussian functions with standard deviation $\sigma_p$ and $\sigma_n$ correspondingly, where $\sigma_p < \sigma_n$.

$$G_\sigma(x) = \frac{1}{\sigma\sqrt{2\pi}} e^{-x^2/2\sigma^2}$$

As mentioned, when applying the DoG filter to real-time data, there is lag. The lag is the half window size, so using the DoG filter defined in FIG. 11 of window size 64 samples, and if the sample rate is 1 Hz, the lag is as long as 32 seconds (e.g., window size of 64 seconds) in a temporal domain. A process that involves real-time monitoring (e.g., optionally control, etc.) using real-time dataset may not afford backward processing due to the lags in response.

To minimize the lag in response to real-time data, an approach can involve defining a filter to use less than a full filter, for example, consider using half of a filter and defining it not in the spatial domain x but in a temporal domain t; noting that in some instances, depending on dimension of data, a spatial domain may be utilized (e.g., a depth, where depth may be measured depth, total vertical depth, etc.). As an example, an approach can utilize half of a filter in a temporal domain where such a filter can include a maximum value that is positive that decreases to a minimum value that is negative that increases to a value of approximately zero (e.g., in an asymptotic manner, etc.). Such an approach can include defining a zero-lag DoG (ZL-DoG) filter Z(t), for example, per Equation 2 below.

$$Z(t) = \frac{G_p(t) - k \cdot G_n(t)}{N} \quad (0 \le t \le t_w), \quad (2)$$

where t is the time, $t_w$ is the time window size, the function $G_\sigma(t)$ is a Gaussian function, $\sigma_p$ and $\sigma_n$ are standard deviations of the positive and negative Gaussians correspondingly ($\sigma_p < \sigma_n$), k and N are constants to normalize the filter (derived in Equation 5 and 7).

Figure 12:
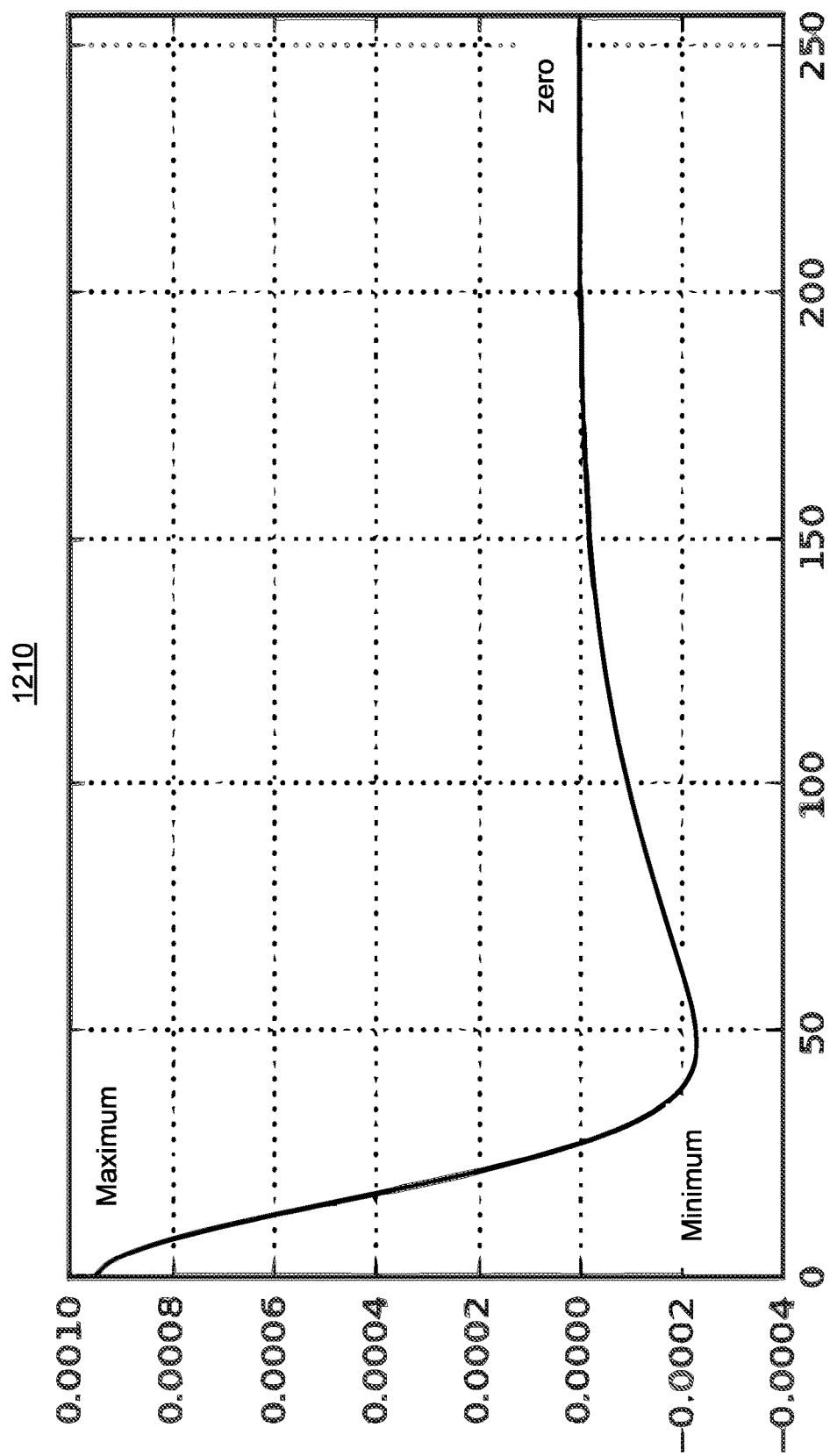
FIG. 12 illustrates an example plot.

FIG. 12 shows a plot 1210 of a Difference of Gaussians (DoG) filter that can be implemented with zero lag in the temporal domain. In the plot 1210, labels are included as to a maximum positive value, a minimum negative value and a zero value. As mentioned, a filter can be defined, along a dimension in a 2D domain, as including a maximum positive value that decreases to a minimum negative value that increases to a value of approximately zero (e.g., to zero, asymptotically toward zero, etc.). Such a definition can be in along a dimension that corresponds to a window such that the window begins at the maximum positive value, includes the minimum negative value and ends at approximately the zero value.

As an example, a ZL-DoG filter can be implemented with a selected window size, for example, consider a window value of approximately 256 samples. Such a filter can be normalized where, for example, k=1.0185 and N=19.62 for signal of a sample rate of 1 Hz.

As explained through various equations and examples, by using half of the DoG filter, a method can reduce lag because the DoG filter is a zero-phase filter, which means it is symmetric along a middle of axis (e.g., a central axis that corresponds to a maximum or minimum if inverted), or H(t)=H(−t). Half of the filter shape can preserve "edge" enhancing functionality and minimize response lag. As explained, a filter can be defined in along a dimension (e.g., in a two-dimensional domain) as beginning at a maximum positive value and ending at approximately a zero value with a minimum negative value between the beginning and the end.

Figure 13:
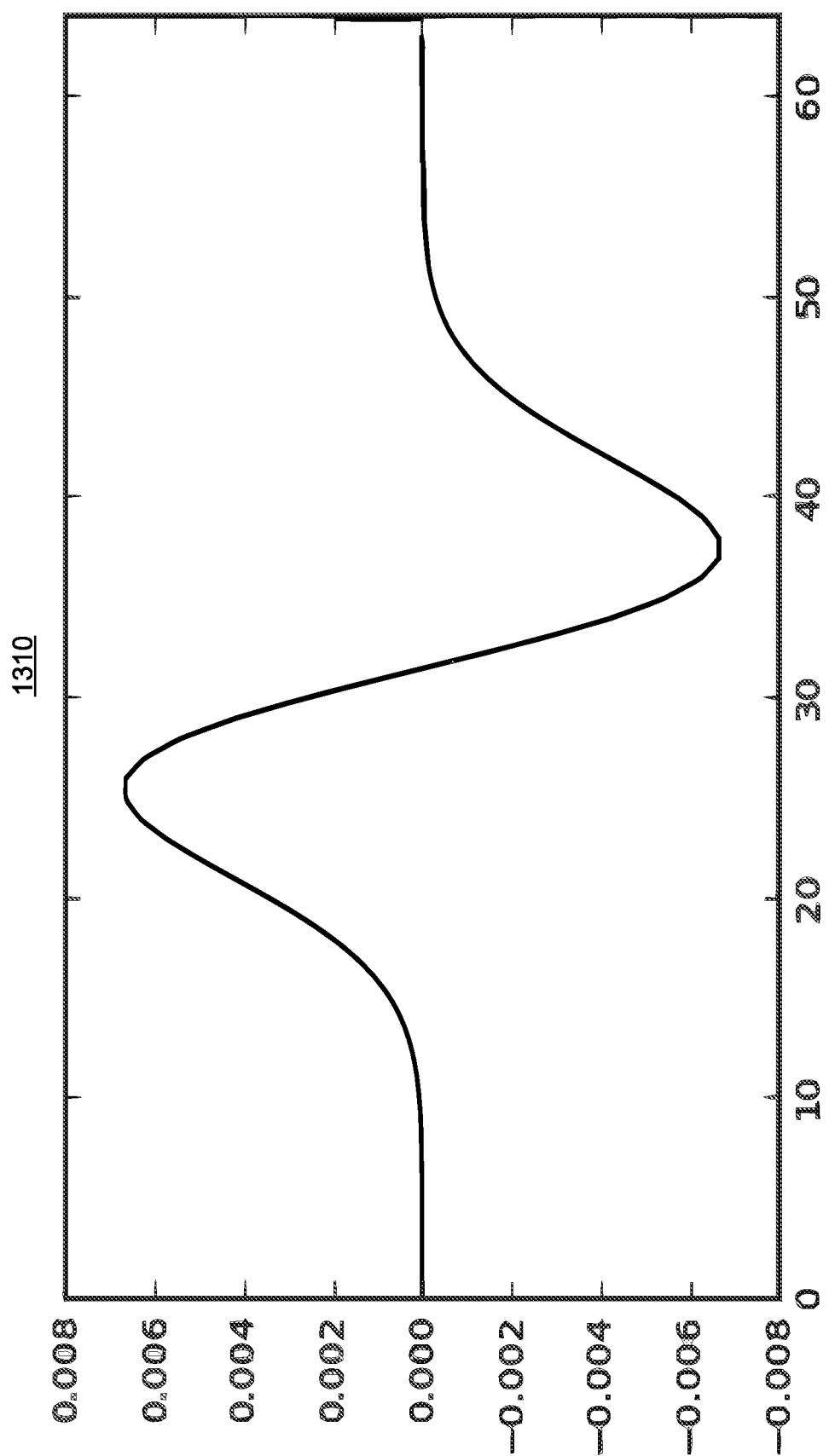
FIG. 13 illustrates an example plot.

FIG. 13 shows a plot 1310 of the derivative of a Gaussian filter, which may be used as an edge enhancer, but due to it is not being a zero-phase filter, it cannot minimize the response lag by splitting it into half. As shown in FIG. 13, the derivative is not symmetric about a central axis; rather, it is rotationally symmetric by 180 degrees (e.g., the right half or the left half can be rotated by 180 degrees to match the other half). Specifically, FIG. 13 shows the derivative of a Gaussian filter where the x-axis is the indices of samples (e.g., samples 0 to approximately 65) and where the sample rate may be 1 Hz.

Figure 14:
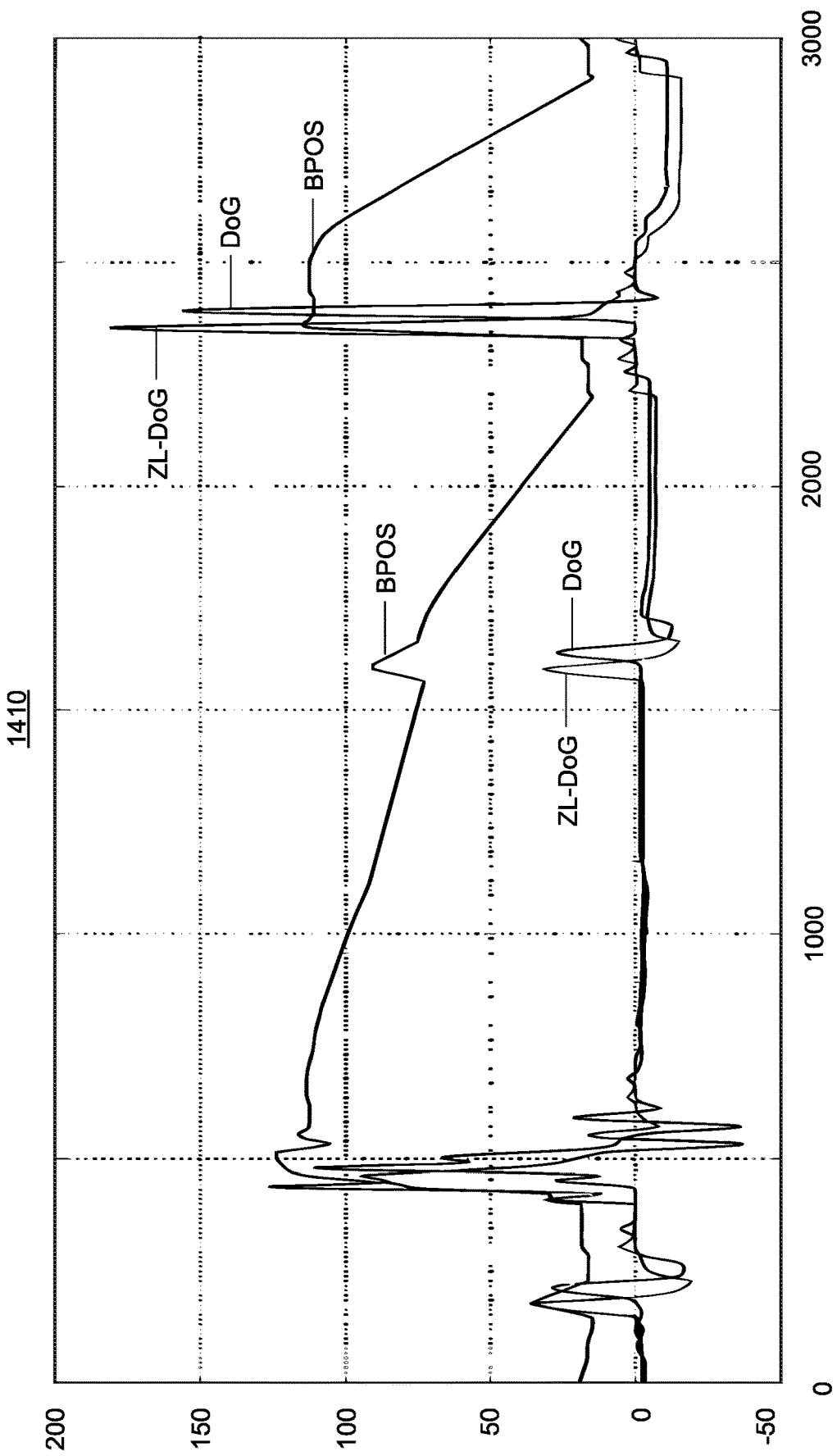
FIG. 14 illustrates an example plot.

FIG. 14 shows a plot 1410 where the ZL-DoG filter minimizes the response lag, for example, as compared to various other filters. As shown in FIG. 14, the block position channel (BPOS) changes with respect to time (e.g., sample) and by applying the ZL-DoG filter, the response lag is minimized. FIG. 14 also shows a a derivative of a Gaussian (DoG) filter, which shows lag compared to the ZL-DoG filter. Such lag may cause inappropriate actions, particularly where a controller is configured to receive a signal based on such output (e.g., via triggering, analysis, etc.). In such a scenario, the ZL-DoG filter will output a more accurate indication of a change in the BPOS channel data, which can be real-time data and where the output can be real-time output, which may be received by a controller that controls one or more operations based at least in part on filtered BPOS channel data. For example, a controller (or control system) can implement a filter that reduces lag when compared to other types of filters (e.g., DoG) where such a filter can be defined along a dimension in a two-dimensional domain as starting at a starting point along the dimension with a maximum positive value (in the other dimension) that decreases to a minimum negative value (in the other dimension) that increases to approximately zero (in the other dimension) at an ending point. Such a filter can be defined as a function with respect to values along the dimension.

Again, FIG. 14 shows the plot 1410 that illustrates how the response lag is minimized with a zero-lag DoG filter. The plot 1410 shows the response lag is minimized with zero-lag DoG filter when compared to a derivative of a Gaussian (DoG) filter when applied to enhance the edges of the Block Position (BPOS) channel data. In the plot 1410, the filter response is scaled-up for better visualization.

As an example, a filter can be a discrete ZL-DoG filter in a temporal domain. For example, given a desired time range $(-t_w, t_w)$, a discrete DoG filter can be generated with window size $2t_w+1$. Hence, in such an example, the corresponding zero-lag DoG filter is on half of the time range $(0, t_w)$. To address a DC component of the zero-lag DoG filter Z(t), it is possible to apply the following:

$$\sum_{t=0}^{t_w} Z(t) = 0. \quad (3)$$

The zero-lag DoG filter may be utilized, for example, to estimate the derivative of an input signal by adjusting the filter response to a ramp signal, such that:

$$\sum_{t=0}^{t_w} Z(t_w - t) \cdot R(t) = 1, \quad (4)$$

where R(t) is a ramp function, R(t)=t.

For the first condition (Eq. 3), an approach can introduce a constant k in function F(t), defined below:

$$F(t) = G_p(t) - k \cdot G_n(t) (0 \le t \le t_w),$$

therefore, $$\sum_{t=0}^{t_w} F(t) = \sum_{t=0}^{t_w} G_p(t) - k \sum_{t=0}^{t_w} G_n(t) = 0.$$

Since the integration of the discrete Gaussian filter is unity, when the window size is large enough:

$$\sum_{t=t_w}^{t_w} G_p(t) = 1,$$

Hence, $$\sum_{t=0}^{t_w} G_p(t) = G_p(0) + \frac{1 - G_p(0)}{2},$$

and $$\sum_{t=0}^{t_w} G_n(t) = G_n(0) + \frac{1 - G_n(0)}{2},$$

it is possible to derive that $$k = \frac{G_p(0) + 1}{G_n(0) + 1}.$$

By expanding $G_p(0)$ and $G_n(0)$ with Gaussians, k can be defined as:

$$k = \left(\frac{\sigma_n}{\sigma_p}\right)\left(\frac{1 + \sigma_p\sqrt{2\pi}}{1 + \sigma_n\sqrt{2\pi}}\right). \quad (5)$$

As shown in Equation 5, above, the parameter k is defined by the ratio of the two standard deviations $\sigma_p$ and $\sigma_n$. A ratio can be selected that may be unity or other than unity. For example, consider the ratio utilized in various trails being defined as $\sigma_n = 4\sigma_p$. As an example, k can be a constant 1.0185.

To derive a normalization factor N, consider:

$$\sum_{t=0}^{t_w} \frac{F(t_w - t)}{N} \cdot R(t) = 1 \quad (6)$$

where R(t) is a ramp function as introduced in Equation 4. Therefore, $$N = \sum_{t=0}^{t_w} (F(t_w - t) \cdot R(t)). \quad (7)$$

An example of pseudo code to generate a zero-lag DoG filter is presented below:

Example pseudocode for calculating a ZL-DoG filter in temporal domain

1: procedure ZLDoG Window Size: $t_w$
2: $\sigma_n \leftarrow t_w/4$
3: $\sigma_p \leftarrow \sigma_n/4$
4: $t \leftarrow [0, \ldots, t_w - 1]$
5: $G_p \leftarrow$ Gaussian($\sigma_p$, t)
6: $G_p \leftarrow$ Gaussian($\sigma_p$, t)
7: $$k \leftarrow \left(\frac{\sigma_n}{\sigma_p}\right)\left(\frac{1 + \sigma_p\sqrt{2\pi}}{1 + \sigma_n\sqrt{2\pi}}\right)$$
8: $F \leftarrow G_p - k \cdot G_n$
9: $n \leftarrow 0$
10: for $t = 0 \rightarrow t_w - 1$ do
11: $n \leftarrow n + F(t_w - t) \cdot t$
12: $Z \leftarrow F/n$
13: return Z In such an approach, where a velocity is unity, then output can be unity and where velocity is zero, then output can be zero. While velocity is mentioned, velocity is a first derivative with respect to time. Such an approach can be utilzied to determine a first derivative and, for example, be applied in a manner to determine a second derivative (e.g., multiple applications of a filter, etc.).

As shown in the example of FIG. 12, a zero-lag DoG filter can be defined with an appropriate window size, for example, ranging from sample X0 to sample XN, which in FIG. 12 ranges from sample 0 to sample 256 (e.g., with corresponding time as sample time, where for 1 Hz, the window size is 256 seconds). Such a window size can be selected, adjusted, etc., optionally dynamically, which may be dynamically in response to a change in sample rate (e.g., data acquisition rate). For example, where sample rate is increased, the window size may be decreased with respect to time while keeping a sample range of 256 samples. For example, consider a sample rate of 2 Hz such that a sample range of 256 samples corresponds to 128 seconds. As an example, a window size may be set according to a time, which may be independent or dependent on sample rate or dependent on one or more other factors (e.g., one or more times in a system, time constants of behavior in a system, etc.). As an example, where a window size is 256 samples, the $\sigma_n$ can be ¼ of the window size (i.e., 64 samples), while the $\sigma_p$ can be ¼ of the $\sigma_n$ (i.e., 16 samples or correspond). The k=1.0185, and N=19.62.

As an example, a portion of a symmetric filter can be applied to data from a BPOS channel. For example, a ZL-DoG filter can be applied to data from a BPOS channel. As an example, a method can include applying a ZL-DoG filter to BPOS channel data for estimating block velocity (e.g., BVEL). As an example, a method can include applying a zero-lag DoG filter to samples of BPOS channel data.

Figure 15:
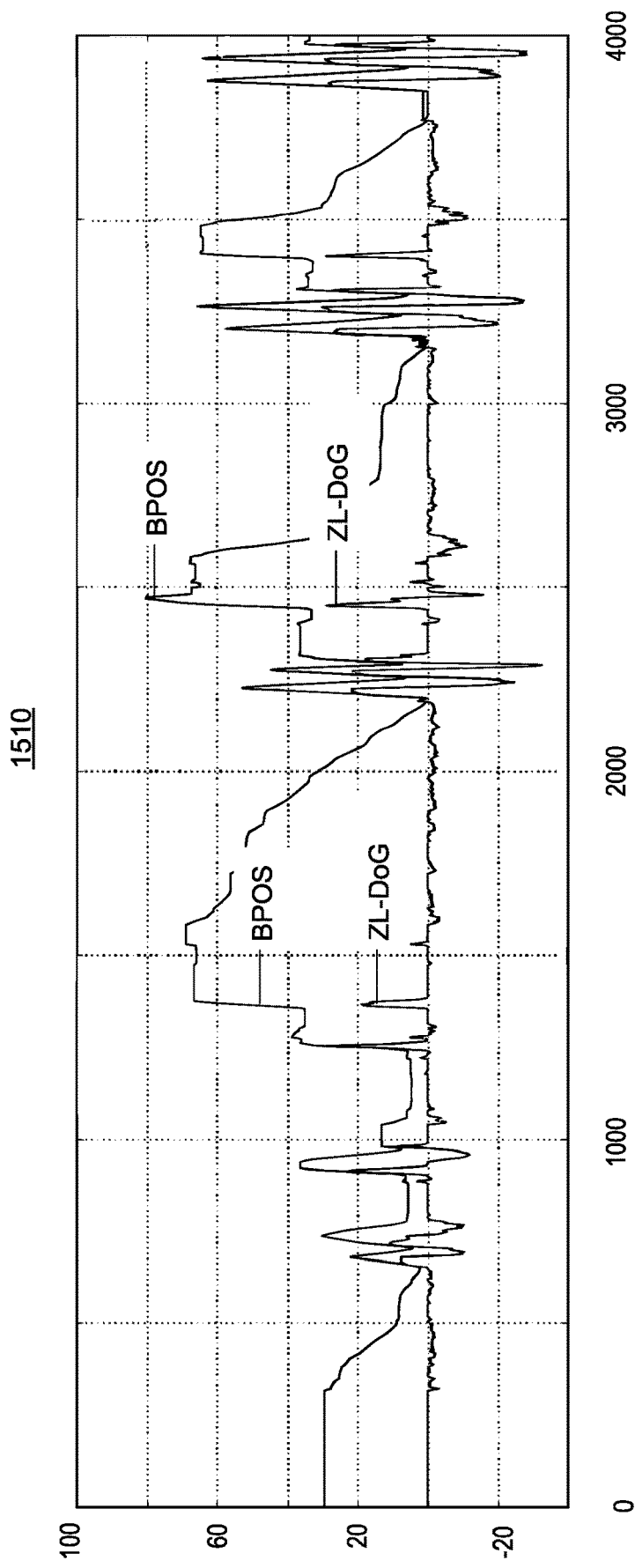
FIG. 15 illustrates an example plot.

FIG. 15 shows a plot 1510 that includes approximately 4000 samples of BPOS channel data with a sample rate of 1 Hz (e.g., a signal with a sample rate of one sample per second). In the example of FIG. 15, the velocity estimated by the zero-lag DoG filter using the approach outline in the pseudocode is rendered and labeled, noting a filter window size of 16. The calculated velocity can be perceived as an enhanced "edge" data of the input, here an enhanced edge of the BPOS channel data. In the plot 1510, via application of the filter, abrupt movements of a block per the BPOS channel data are enhanced while slow and steady movements of the block are suppressed.

Specifically, FIG. 15 shows the plot 1510 as to a segment with 4000 samples of BPOS channel data along with the velocity estimated by the zero-lag DoG filter (scaled-up 10 times for better visualization). The window size in the filter is 16 s (e.g., samples). Block position was reconstructed by integrating the response. Comparing to the original BPOS, the reconstructed signal has an average error of 0.617 ft (stddev=1.359 ft). The error is primarily due to the lag in the filter response, so when the reconstructed signal is shifted with 2 s, the error is reduced and the average error is 0.28 ft (stddev=0.28 ft).

As explained, to validate the velocity, the filter response is integrated and compared with the original BPOS channel data. From FIG. 15, one observation is that the error mostly occurs at fast block movements, such as during circulation and the block moving upward. During the drilling, the error is approximately 0. The error is due to the lag in the filter response when estimating the velocity, so that when shifting the reconstructed block position for 2 s, the error is reduced. As an example, a method can include shifting filtered data where, for example, such shifted filtered data may be utilzied for one or more analyses. For example, consider machine learning, training a model, etc.

As to peaks and troughs (valleys) detection, a portion of a symmetric filter may be utilized (e.g., a single symmetric half of a symmetric filter). As an example, a ZL-DoG filter can be applied to identify peaks and troughs in an input time series. Peaks and troughs can be defined as zero-crossing points of velocity, where peaks are at velocity changing from positive to negative, while troughs are at velocity changing from negative to positive.

Figure 16:
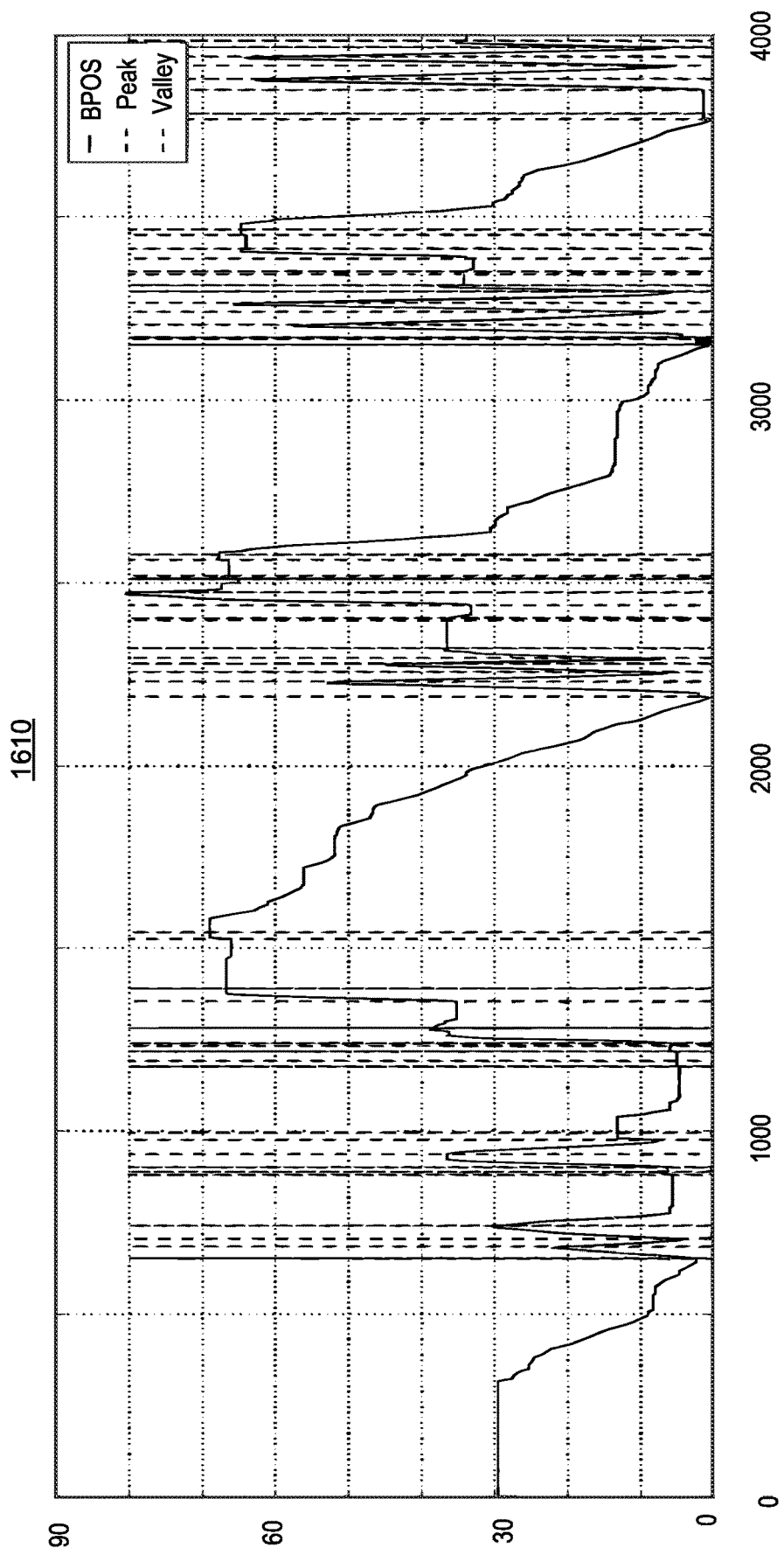
FIG. 16 illustrates an example plot.

FIG. 16 shows an example plot 1610 as to results of peaks and troughs detection using a ZL-DoG filter response as in FIG. 15.

A method can include enhancing abrupt changes of hook load (HKLD) via application of a half of a symmetric filter such as a ZL-DoG filter being half of a DoG filter where the ZL-DoG filter is an example of a half of a symmetric filter, being a single half.

To analyze data of an HKLD channel, a ZL-DoG filter can be applied with a window size of approximately 16 seconds for various drilling states: drilling, tripping in, and tripping out.

Figure 17:
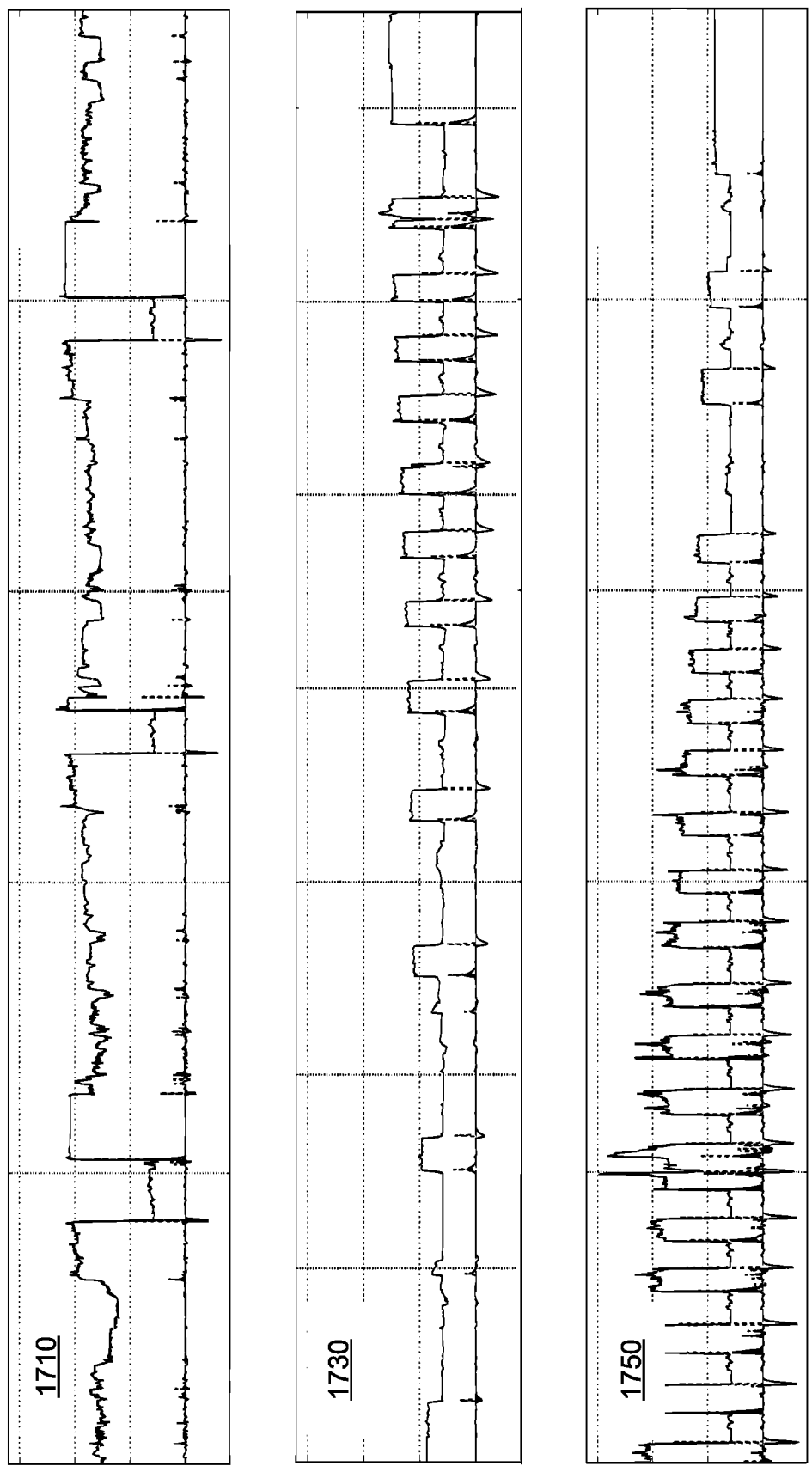
FIG. 17 illustrates example plots.

FIG. 17 shows a three plots 1710, 1730 and 1750 of results from applying a ZL-DoG filter to HKLD channel data. As shown, abrupt changes of HKLD in both upward and downward directions are highlighted with dashed lines with threshold 1.5 klb/s. Highlighted locations are "edges" in the signal, and well correlated with the slips states, even in shallow zones with low contrast.

In the example of FIG. 17, HKLD derivative is estimated for various drilling states. In the plots 1710, 1730 and 1750, the x-axis is the sample indices, and the y-axis is the HKLD in klb with the derivatives estimated. The abrupt changes of HKLD in both upward and downward directions are highlighted with dashed lines, which well correlate with the slips states, even in shallow zones.

Based on the definition of ZL-DoG filter in Equation 2, various parameters can be defined, one or more of which may be set by default, set automatically, set via a graphical user interface, adjusted, etc. For example, consider the following five parameters: the window size $t_w$, the two Gaussian standard deviations $\sigma_p$ and $\sigma_n$, and two normalization constants k and N.

Referring again to the example pseudocode, the standard deviations of the two Gaussians can be set as a ratio to the window size, and the normalization constants can be derived as well. In such an example, one parameter, the window size, remains, which can be utilized to control an overall scale of the ZL-DoG filter.

Figure 18:
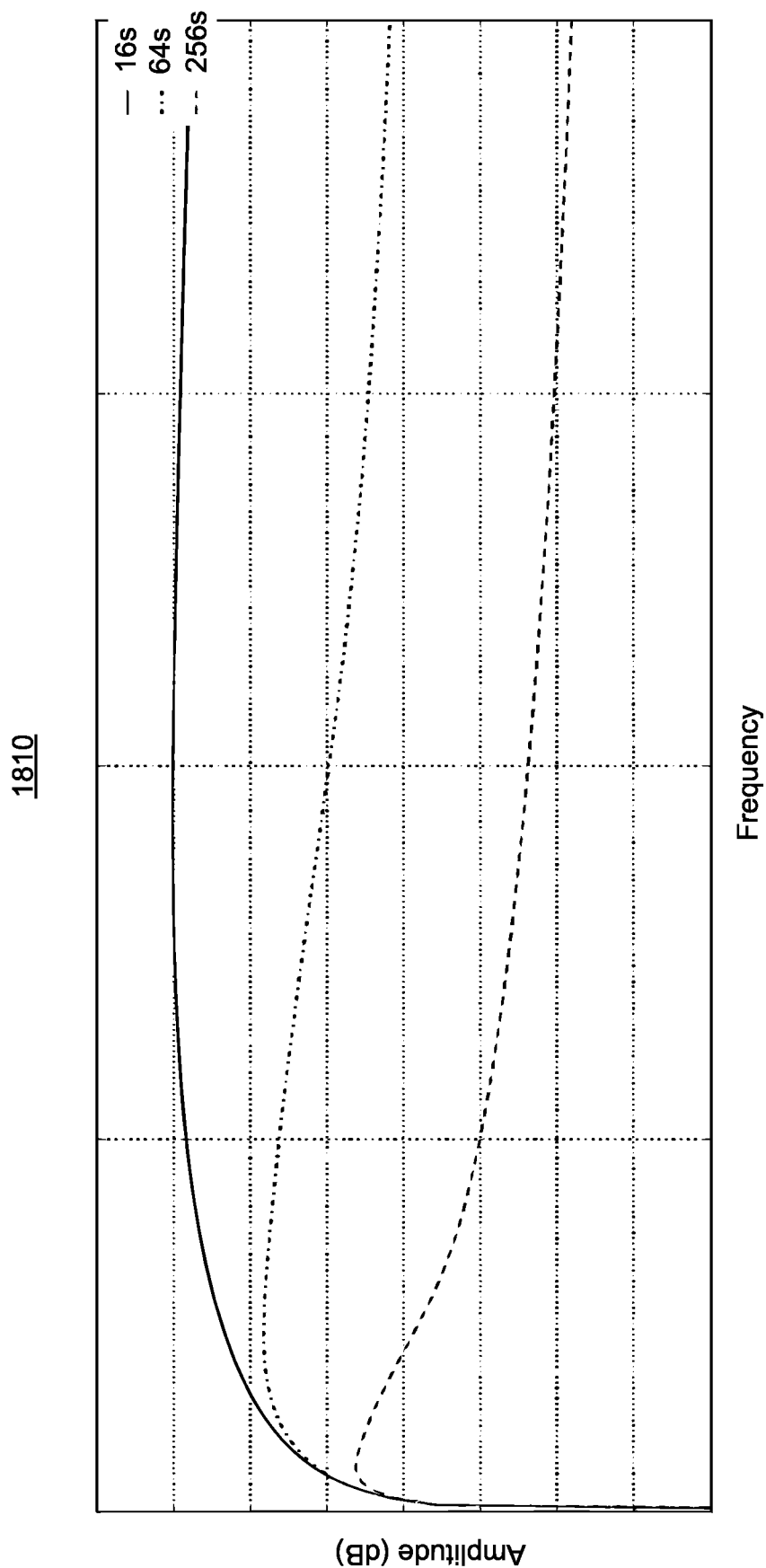
FIG. 18 illustrates an example plot.

FIG. 18 shows a plot 1810 of the frequency responses of a ZL-DoG filter with various window size given a sample rate of 1 Hz (shown with respect to amplitude in decibels). As shown in the plot 1810, a smaller window size enhances higher frequencies, for example, a 16 s window size (upper curve) includes a peak around 1.0 Hz. A filter with a larger window size enhances lower frequencies and can suppress higher frequencies. As illustrated by a middle curve that corresponds to a 64 s window, it includes a peak at around 0.2 Hz, while a filter with a 256 s window (lower curve) includes a peaked at approximately 0.1 Hz. Based on the frequency response and the desired feature frequency in the signal, a method can include selecting (e.g., or adjusting) the corresponding window size to generate a ZL-DoG filter with desired characteristics.

As an example, some lag may exist in a filter response in instances where a signal flips directions relatively quickly (e.g., with respect to sample rate, etc.). Such behavior can be seen for a ZL-DoG filter response through use of two synthetic time data series of spike and step signals.

Figure 19:
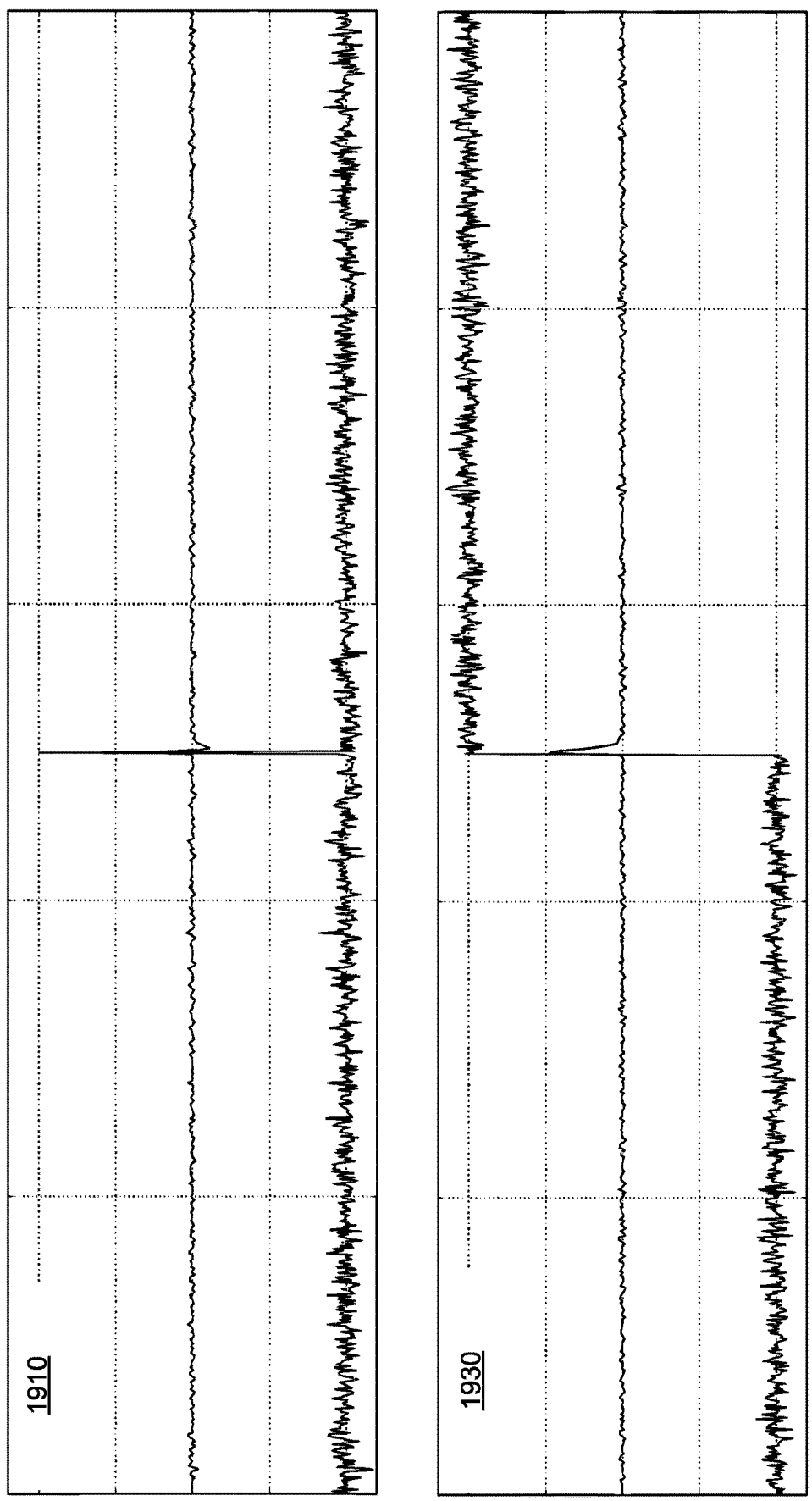
FIG. 19 illustrates example plots.

FIG. 19 shows example plots 1910 and 1930 of a ZL-DoG filter response to a spike signal and to a step signal, which are shown to change rapidly with respect to time (or sample rate). In the example plots 1910 and 1930, the spike and step signals are created with 1000 samples with Gaussian noise (σ=0.05) added, and the sample rates are both at 1 Hz. Substantially horizontal lines, each with a filter response at a particular time (or sample number, fraction of interval between samples, etc.), are shown in the plots 1910 and 1930. In the spike case, the filter response peaks at the time of the spike, which is 500 seconds (e.g., or 500 samples). As to the step case, when the input signal changes its value from −1 to 1 at 500 second (e.g., or 500 samples), the filter response has an immediate (no lag) positive response, while the response is peaked at the immediate next second or sample (e.g., the 501$^{st}$ second or 501$^{st}$ sample). The plots 1910 and 1930 demonstrate that lag in ZL-DoG filter is minimized, while the filter is also stable to noise (e.g., the added noise).

Figure 20:
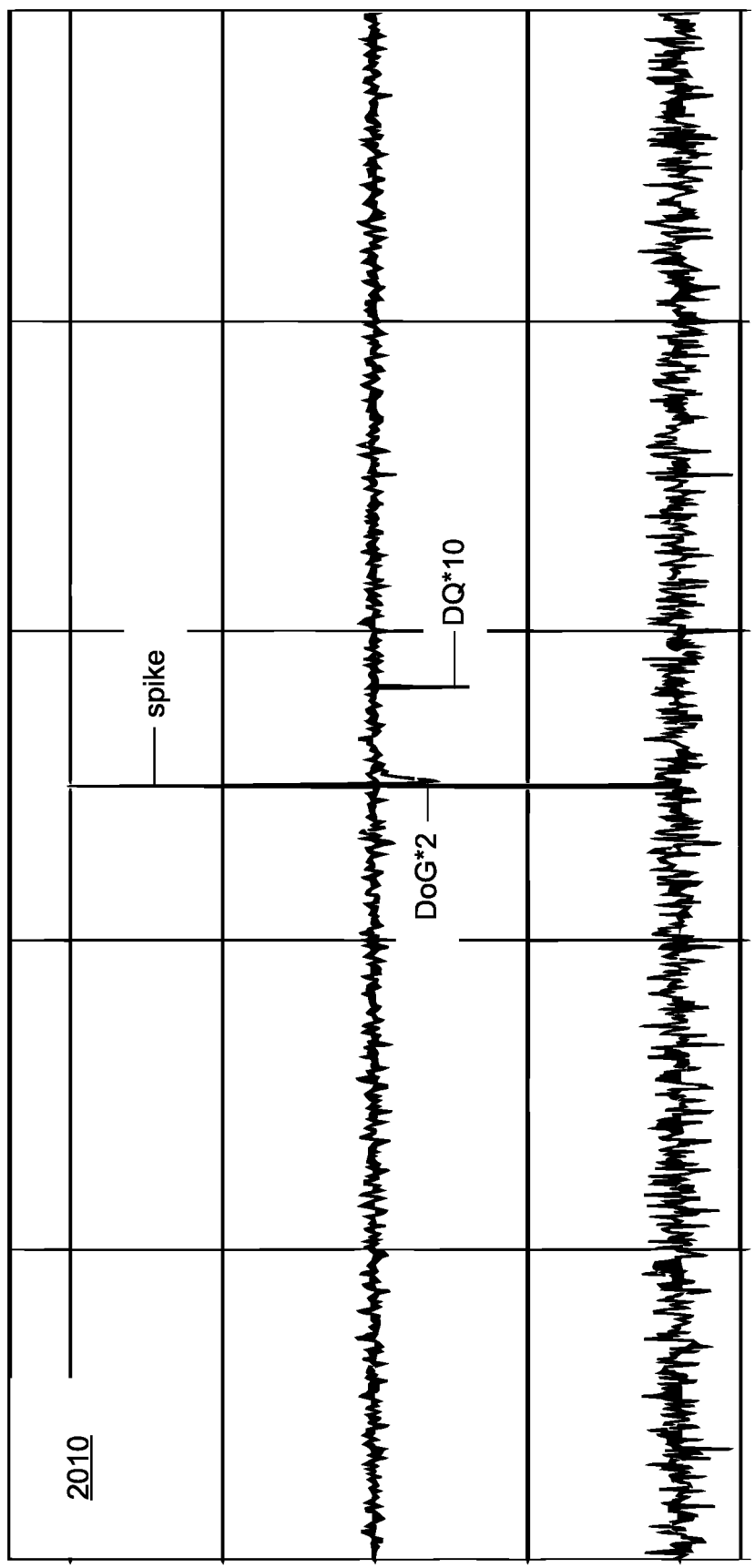
FIG. 20 illustrates an example plot.

FIG. 20 shows an example plot 2010. As mentioned, a DQ filter has a lag of its window size. The plot 2010 compares DQ and ZL-DoG filter responses to a spike signal. The input signal has a spike in the center with noise. In the example of FIG. 20, both filters have a window size of 64 s. Compared with the ZL-DoG filter response, the DQ response has a delayed response (negative spike) where the delay equals to the window size used, which is 64 s. In FIG. 20, the filter responses are scaled-up for better visualization.

Figure 21:
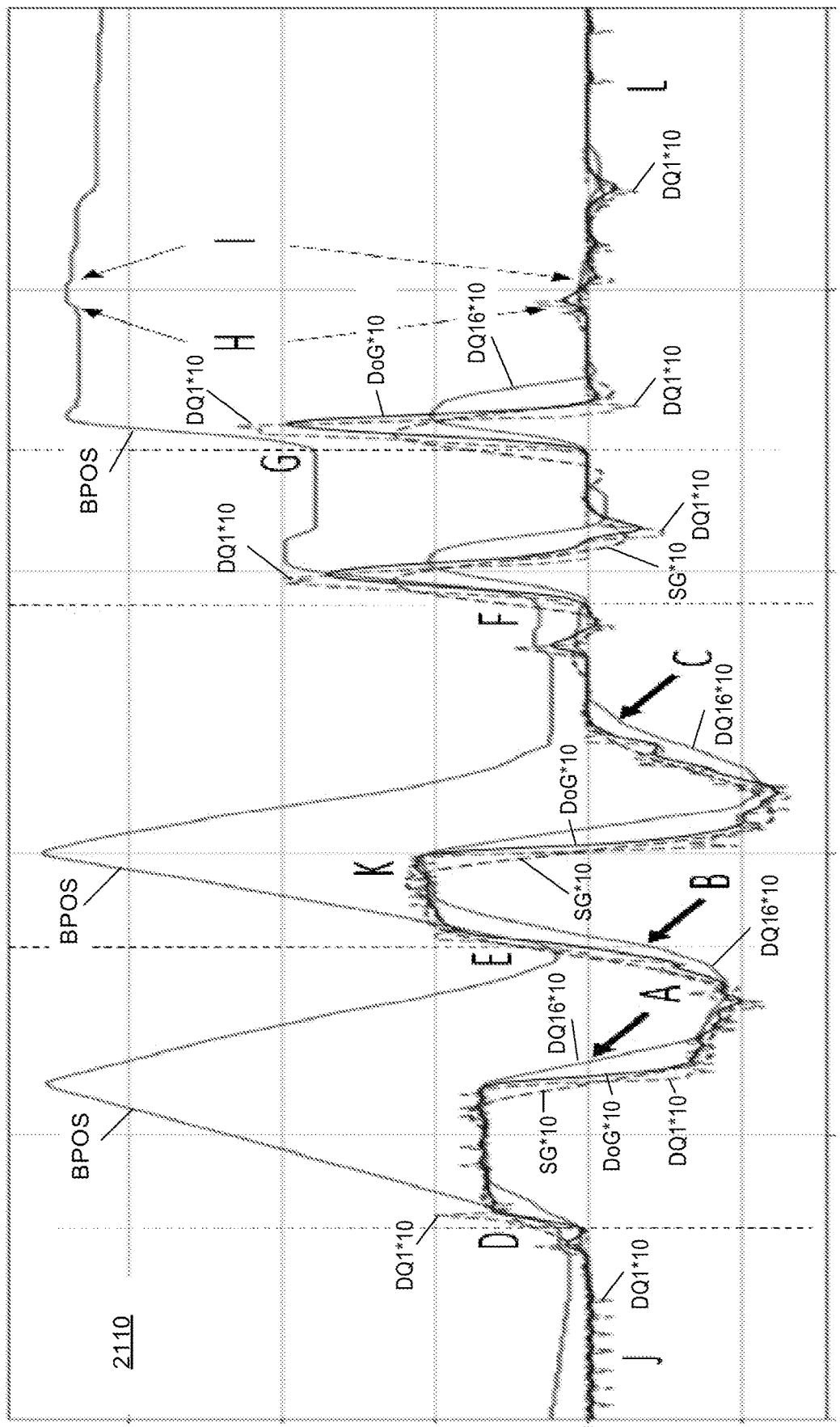
FIG. 21 illustrates an example plot.

FIG. 21 shows an example plot 2100 with a comparison of BPOS velocity as estimated by a SG differentiator, a DQ filter, and a ZL-DoG filter. The input BPOS is actual data from a rigsite. Except for DQ1 (h=1), the filters have a window of 16 s for samples in the past, while the SG filter has an additional 16$s$ extended to the future samples. As shown in the figure, DQ16 is detrimentally delayed when estimates the trends of the input, at downwards (location A), upwards (location B), or steady (location C) when compared with ZL-DoG or SG. SG is too early to predict the increasing of the input signal at locations D, E, F, and G when compared with ZL-DoG and DQ16 due to that SG smooths the samples of the future. For locations H and I, both DQ16 and SG over-smoothed the signal, and does not capture the changes as ZL-DoG does. DQ1 has less-lagged response due to the window is equal to the sample rate, but it is not smooth and incurs spikes due to the quantization noise as shown at locations such as J, K, and L. Although SG exhibits some stability to noise, it does not enhance the abrupt changes as ZL-DoG does, and it demands future data points, which are not be available in real-time applications.

The example plot 2110 of FIG. 21 shows comparisons of BPOS derivatives estimated by various filters. In the plot 2110, the input is the BPOS with 1 Hz sample rate, and four filter responses are compared, two Differential Quotient with window sizes of h=16 and h=1, ZL-DoG and Savitzky-Golay differentiator. The filters have a window of 16 s for samples in the past (except DQ), while the SG filter has an extended 16 s to the future samples. These filter responses are scaled up by 10 times for better visualization. As shown in the figure, DQ16 is significantly delayed when estimates the trends of the input, at downwards (at A), upwards (at B), or steady (at C) when compared with ZL-DoG or SG. SG is too early to predict the increasing of the input signal at locations D, E, F, and G when compared with ZL-DoG and DQ16. For locations H and I, both DQ16 and SG over-smoothed the signal, and do not capture the changes as ZL-DoG does. DQ1 has less-lagged response due to the window is equal to the sample rate but it is not smooth, and incurs spikes due to the quantization noise as shown at locations such as J, K, and L. The input sample rate is at 1 Hz.

FIG. 22 shows example plots 2210, 2230, 2250 and 2270, which include BPOS channel data and filtered data, as filtered by the ZL-DoG filter. Additional information is also shown in the plots 2210, 2230, 2250 and 2270, which pertains to velocity, specifically, a move up/down peak speed ratio. In the plots 2210, 2230, 2250 and 2270, the filter response (e.g., filtered data) is multiplied by a factor of 5 while the move up/down peak speed ratio is multiplied by a factor of 20, which provides for visualization in a common plot with respect to the BPOS channel data. Specifically, the plot 2210 corresponds to circulation, the plot 2230 corresponds to drilling, the plot 2250 corresponds to tripping in and the plot 2270 corresponds to tripping out. Such operations can be differentiated by a comparison of the filter response (e.g., filtered data). As an example, a system such as a dynamic field operations system can include one or more filters to generate one or more filter responses for acquired data which may be utilized for control or one or more other purposes. As to machine learning, various information such as filter responses may be utilized to train a model or models where a trained model or models may be utilized for purposes of classification, control, etc. For example, a trained model that is trained at least in part on filter response may be utilized to classify 1-D channel data during a field operation, which may allow for assessing the field operation, controlling the field operation, etc.

In various methods, signal velocity can be estimated by filter convolution. In such examples, the computational cost for implementation tends to be low. For example, for 20 trials to estimate a HKLD channel with 1.489 million samples from a real-world rigsite, the average computational speed achieved was 306 ms per million samples or about 3.4 million samples/sec for a filter with window size of 16 seconds (INTEL® Core i7 dual-core at 2.90 GHz with 16 GB RAM, filter implemented in Python as per the example pseudocode).

As an example, a zero-lag DoG filter can be applied to 1-D series data for performing one or more of analysis, control, etc., in real time. As an example, such a filter can be applied to: (1) estimate a velocity/derivative, (2) enhance an abrupt change, or "edges", while suppressing slow changes, and (3) identify/detection of peaks and troughs in a signal. As an example, a ZL-DoG filter may be applied to extract one or more types of features, which may be captured in data filtered. In such an example, a dimension (e.g., a time, etc.) between two features may be utilized to determine a frequency of occurrence of an event or events. As an example, a ZL-DoG filter can be relatively stable to one or more types of noise that can be present in 1-D series data associated with rigsite operations and can be computationally light-weighted with minimum lag, which is suitable for real-time time series data processing.

Figure 23:
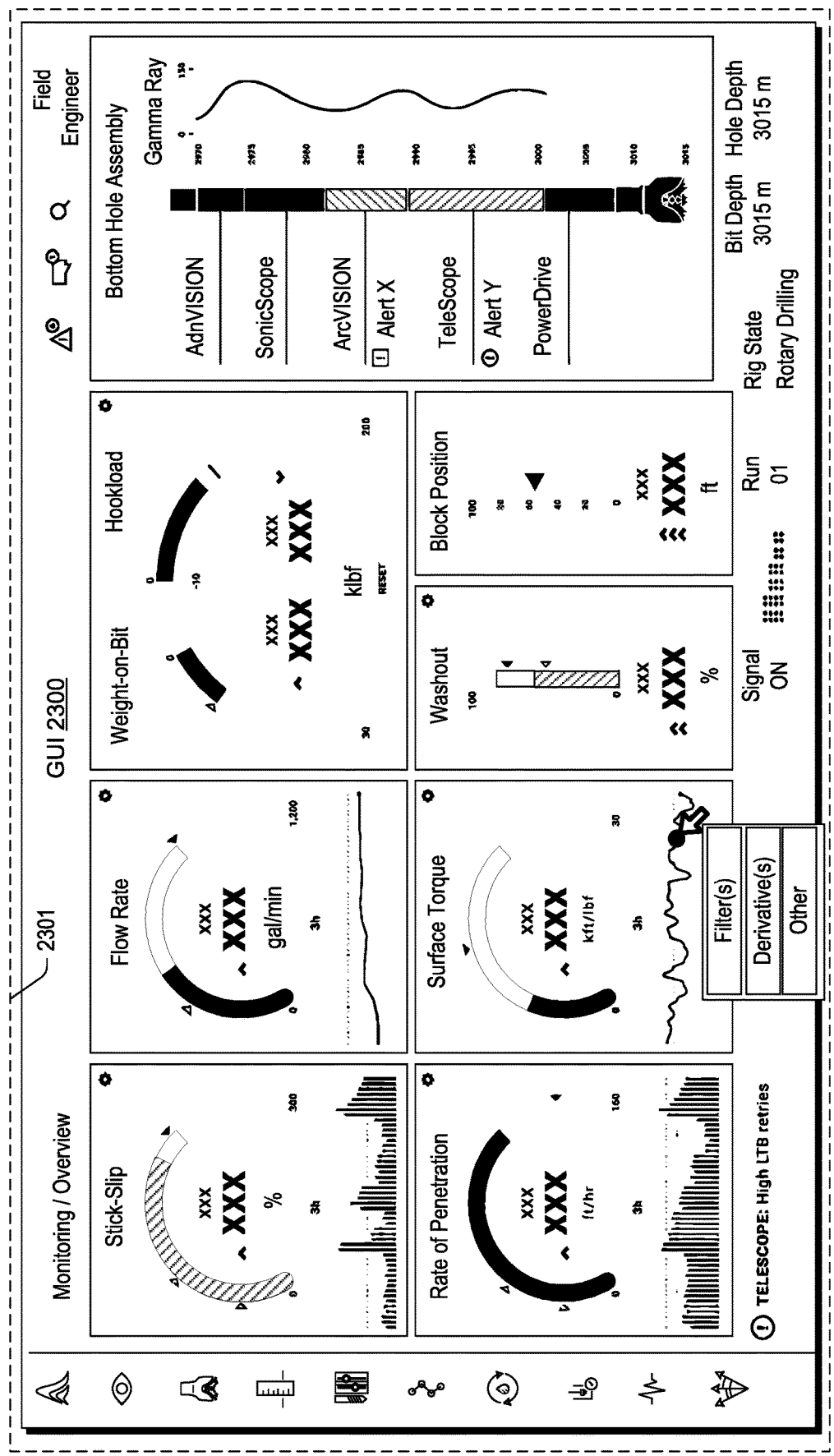
FIG. 23 illustrates an example of a graphical user interface.

FIG. 23 shows an example of a GUI 2300 that is rendered to a display device 2301, represented by a dashed box. For example, consider a flat panel display, which may be, for example, a touchscreen display. As an example, one or more of the plots illustrated herein may be rendered to a display by a computational system, which may be a dynamic field operations system. Such plots may be rendered as part of a graphical user interface (GUI) and may be interactive where a user may instruct a computational system to render a portion of a data, a filter response, a control signal, etc.

In the example of FIG. 23, the GUI 2300 may be an operational dashboard where the state of one or more pieces of equipment, operations, etc. may be rendered visually, for example, via graphics and/or numbers. As an example, various colors may be utilized to convey state information. As an example, audio may be associated with the GUI 2300 and changes thereto, etc. For example, where a parameter reaches a limit, a color change may occur to a graphic of the display device 2301 and an audio alarm may be rendered via one or more speakers.

In the example of FIG. 23, the GUI 2300 can include various graphical controls that can be associated with various operations to perform one or more methods that include filtering data, for example, for generating a filter response. For example, a graphical control associated with one or more plots of data such as the surface torque data may be selectable, as shown in FIG. 23. For example, a user may select a position on a plot such as the plot of surface torque versus time to cause the GUI 2300 to render a menu to the display. As shown, the menu items can include filter(s), derivative(s) and other. In such an example, the filter(s) item may be selected to cause rendering of information as to one or more filters, which may be defined as F1 to FN where one or more of the filters may be selected. In such an example, the filters may differ with respect to standard deviations of Gaussian distributions utilized to define a ZL-DoG filter, may differ with respect to window (e.g., number of samples, time width, etc.), and/or may differ with respect to one or more other aspects. As to derivative(s), such an item may be selected to choose a type of derivate to determine, detect, display, etc. (e.g., a first derivative, a second derivative, etc.). In the example of FIG. 23, a user may select a particular point or region on a plot of data where the user may desire information about that point or region. For example, where a plot appears to include data that may indicate a particular state, the GUI may be interactive to perform a classification (e.g., identification) of the state based at least in part on a filter response of the data (e.g., per one or more filters). As an example, a method may execute in a background mode where a selection via a graphical control causes rendering of information generated by a method such as the method 700 of FIG. 7.

As an example, a method can include acquiring data associated with a field operation of equipment in a geologic environment; filtering the data using a filter where the filter includes, along a dimension, a single maximum positive value that decreases to a single minimum negative value that increases to approximately zero; and, based on the filtering, issuing a control signal to the equipment in the geologic environment. In such an example, the data can include 1-D time series data where the dimension corresponds to time. In such an example, the filter can include a time window value defined along the dimension. In such an example, the filter can be defined by the single maximum positive value that decreases to the single minimum negative value that increases to approximately zero as well as the time window value, which can define a position of the single maximum positive value and a position of the point that is approximately zero (e.g., or null). In such an example, the filter may be a function, which may be defined by a difference between two Gaussian distributions where each is defined by a corresponding standard deviation.

As an example, a filter can be a half of a difference of Gaussians (DoG) filter. In such an example, the half can be the half that includes the maximum positive value and extends to the right of its maximum positive value. As an example, a difference of Gaussians (DoG) filter can include a first standard deviation value for a first Gaussian distribution and a second standard deviation value for a second Gaussian distribution where the first standard deviation value is greater than the second standard deviation value. As an example, a filter can include a constant that depends on a first standard deviation value and a second standard deviation value.

As an example, data can include 1-D time series data and a filter can be normalized with respect to a time window value.

As an example, data can include block position values of a traveling block that moves during the field operation. In such an example, the block position values may be from a channel of a data acquisition system of a rig.

As an example, data can include load values with respect to time of equipment disposed at least in part in a borehole of a geologic environment. In such an example, the load values may be from a channel of a data acquisition system of a rig.

As an example, data can include wireline equipment values (e.g., corresponding to movement of a wireline tool, etc.). In such an example, a method can include comparing filtered data to log data, which may provide for assessing quality of the log data. For example, log data may be with respect to depth and the filtered data may indicate the velocity and/or acceleration of a tool that acquired the log data at a particular depth. Such an approach may provide for determining whether the tool was at or within an acceptable velocity and/or acceleration range at the time of acquiring the data. As an example, tool data may include motion artifacts, which may be adjusted or otherwise accounted for by filter response of movement of the tool that acquired the tool data. For example, consider spatial smearing where such smearing may be adjusted based at least in part on velocity of the tool.

As an example, data can include time series data and filtering the data can include determining velocity values for the time series data (and/or acceleration values).

As an example, a method can include detecting a change in state of a field operation based on filtering. In such an example, consider issuing a control signal is responsive to the detecting and/or detecting the change in the state by detecting a change in a derivative of position of a piece of the equipment with respect to time and/or detecting the change in the state by detecting a change in a derivative of load of a piece of the equipment with respect to time. As an example, a method can include detecting a change in a state at least in part by detecting a change in a second derivative of position of a piece of equipment with respect to time.

As an example, a system can include one or more processors; a network interface operatively coupled to the one or more processors; memory operatively coupled to the one or more processors; and processor-executable instructions stored in the memory and executable by at least one of the processors to instruct the system to: acquire data associated with a field operation of equipment in a geologic environment; apply a filter to the data where the filter includes, along a dimension, a single maximum positive value that decreases to a single minimum negative value that increases to approximately zero; and based on application of the filter to the data, issue a control signal to the equipment in the geologic environment. In such an example, the data can include 1-D time series data where the dimension corresponds to time. As an example, a filter can be a half of a difference of Gaussians (DoG) filter (e.g., a half that starts at the maximum and that ends at approximately zero (e.g., or a null).

As an example, one or more computer-readable storage media can include computer-executable instructions executable to instruct a computing system to: acquire data associated with a field operation of equipment in a geologic environment; apply a filter to the data where the filter includes, along a dimension, a single maximum positive value that decreases to a single minimum negative value that increases to approximately zero; and based on application of the filter to the data, issue a control signal to the equipment in the geologic environment. In such an example, the data can include 1-D time series data where the dimension corresponds to time.

Figure 24:
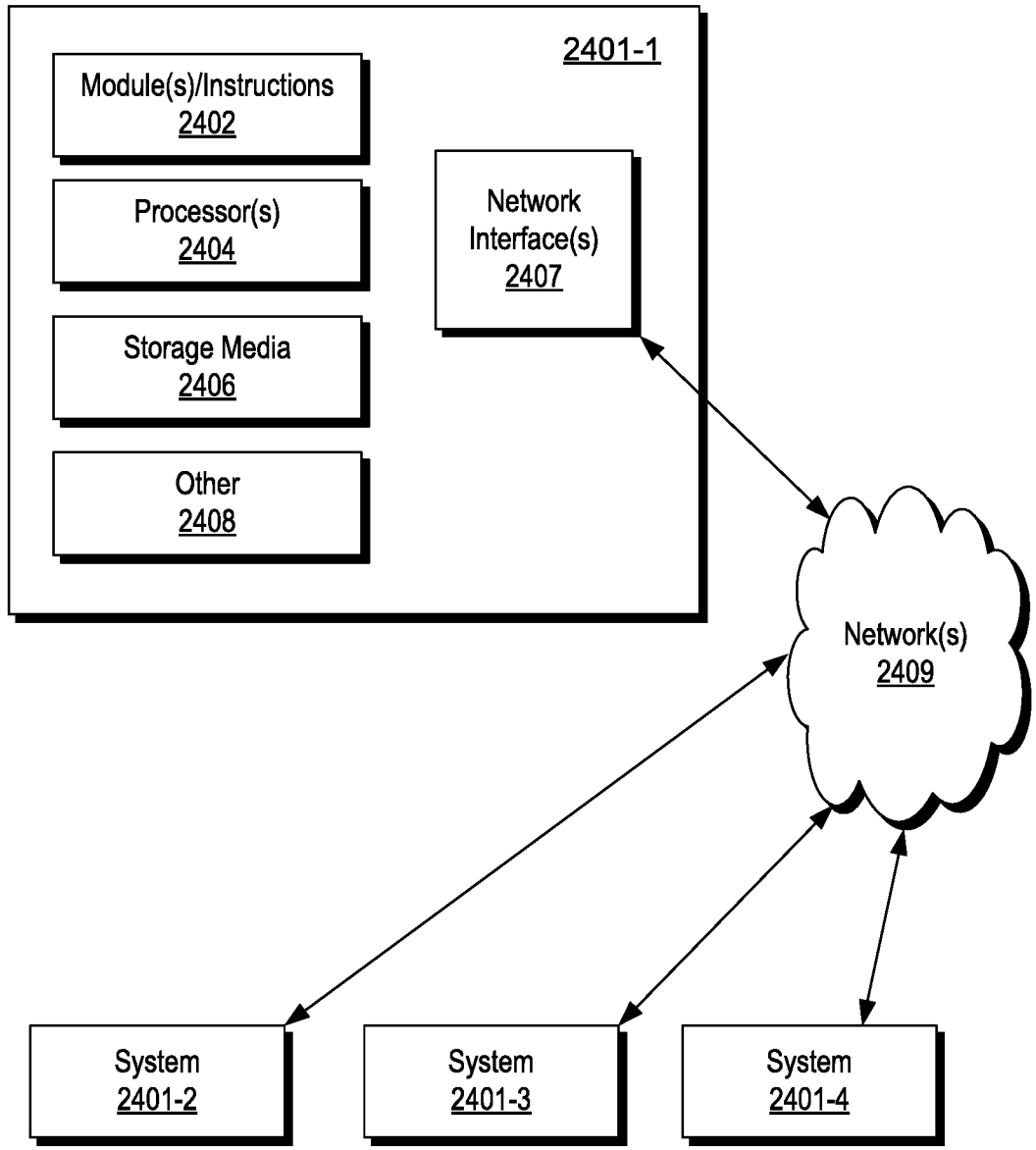
FIG. 24 illustrates examples of computing and networking equipment.

In some embodiments, a method or methods may be executed by a computing system. FIG. 24 shows an example of a system 2400 that can include one or more computing systems 2401-1, 2401-2, 2401-3 and 2401-4, which may be operatively coupled via one or more networks 2409, which may include wired and/or wireless networks.

As an example, a system can include an individual computer system or an arrangement of distributed computer systems. In the example of FIG. 24, the computer system 2401-1 can include one or more modules 2402, which may be or include processor-executable instructions, for example, executable to perform various tasks (e.g., receiving information, requesting information, processing information, simulation, outputting information, etc.).

As an example, a module may be executed independently, or in coordination with, one or more processors 2404, which is (or are) operatively coupled to one or more storage media 2406 (e.g., via wire, wirelessly, etc.). As an example, one or more of the one or more processors 2404 can be operatively coupled to at least one of one or more network interface 2407. In such an example, the computer system 2401-1 can transmit and/or receive information, for example, via the one or more networks 2409 (e.g., consider one or more of the Internet, a private network, a cellular network, a satellite network, etc.).

As an example, the computer system 2401-1 may receive from and/or transmit information to one or more other devices, which may be or include, for example, one or more of the computer systems 2401-2, etc. A device may be located in a physical location that differs from that of the computer system 2401-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2406 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

FIG. 25 shows components of a computing system 2500 and a networked system 2510. The system 2500 includes one or more processors 2502, memory and/or storage components 2504, one or more input and/or output devices 2506 and a bus 2508. According to an embodiment, instructions may be stored in one or more computer-readable media (e.g., memory/storage components 2504). Such instructions may be read by one or more processors (e.g., the processor(s) 2502) via a communication bus (e.g., the bus 2508), which may be wired or wireless. The one or more processors may execute such instructions to implement (wholly or in part) one or more attributes (e.g., as part of a method). A user may view output from and interact with a process via an I/O device (e.g., the device 2506). According to an embodiment, a computer-readable medium may be a storage component such as a physical memory storage device, for example, a chip, a chip on a package, a memory card, etc.

According to an embodiment, components may be distributed, such as in the network system 2510. The network system 2510 includes components 2522-1, 2522-2, 2522-3, . . . 2522-N. For example, the components 2522-1 may include the processor(s) 2502 while the component(s) 2522-3 may include memory accessible by the processor(s) 2502. Further, the component(s) 2522-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
    acquiring sensor data in real-time during a field operation that utilizes a reel to move equipment in a borehole in a geologic environment, wherein the sensor data comprise block position values of a traveling block that moves responsive to rotation of the reel during the field operation;
    filtering the sensor data using a filter wherein the filter comprises a half of a difference of Gaussians (DoG) filter wherein, along a dimension, a single maximum positive value decreases to a single minimum negative value that increases to approximately zero; and
    based on the filtering, issuing a control signal to control the field operation.

2. The method of claim 1 wherein the sensor data comprise 1-D time series data and wherein the dimension corresponds to time.

3. The method of claim 2 wherein the filter comprises a time window value defined along the dimension.

4. The method of claim 1 wherein the difference of Gaussians (DoG) filter comprises a first standard deviation value for a first Gaussian distribution and a second standard deviation value for a second Gaussian distribution wherein the first standard deviation value is greater than the second standard deviation value.

5. The method of claim 4 wherein the filter comprises a constant that depends on the first standard deviation value and the second standard deviation value.

6. The method of claim 1 wherein the sensor data comprise 1-D time series data and wherein the filter is normalized with respect to a time window value.

7. The method of claim 1 wherein the sensor data comprise load values with respect to time of the equipment disposed at least in part in the borehole of the geologic environment.

8. The method of claim 1 wherein the sensor data comprise wireline equipment values.

9. The method of claim 1 wherein the sensor data comprise time series data and wherein filtering the data comprises determining velocity values for the time series data.

10. The method of claim 1 comprising detecting a change in state of the field operation based on the filtering and issuing the control signal responsive to the detecting.

11. The method of claim 10 wherein the detecting the change in the state comprises detecting a change in a derivative of position of a piece of the equipment with respect to time or wherein the detecting the change in the state comprises detecting a change in a derivative of load of a piece of the equipment with respect to time.

12. The method of claim 1, wherein the sensor data comprise hook load values for a hook operatively coupled to the traveling block.

13. A system comprising:
    one or more processors;
    a network interface operatively coupled to the one or more processors;
    memory operatively coupled to the one or more processors; and
    processor-executable instructions stored in the memory and executable by at least one of the processors to instruct the system to:
    acquire sensor data in real-time during a field operation that utilizes a reel to move equipment in a borehole in a geologic environment, wherein the sensor data comprise block position values of a traveling block that moves responsive to rotation of the reel during the field operation;
    apply a filter to the sensor data wherein the filter comprises a half of a difference of Gaussians (DoG) filter wherein, along a dimension, a single maximum positive value decreases to a single minimum negative value that increases to approximately zero; and
    based on application of the filter to the data, issue a control signal to control the field operation.

14. The system of claim 13 wherein the difference of Gaussians (DoG) filter comprises a first standard deviation value for a first Gaussian distribution and a second standard deviation value for a second Gaussian distribution wherein the first standard deviation value is greater than the second standard deviation value.

15. The system of claim 14 wherein the filter comprises a constant that depends on the first standard deviation value and the second standard deviation value.

16. The system of claim 13 wherein the processor-executable instructions comprise instructions to detect a change in state of the field operation based on the application of the filter and optionally issuing the control signal responsive to the detecting.

17. The system of claim 16 wherein the processor-executable instructions comprise instructions to detect the change in the state via detection of a change in a derivative of position of a piece of the equipment with respect to time or to detect the change in the state via detection of a change in a derivative of load of a piece of the equipment with respect to time.

18. The system of claim 13, wherein the sensor data comprise hook load values for a hook operatively coupled to the traveling block.

19. One or more non-transitory computer-readable storage media comprising computer-executable instructions executable to instruct a computing system to:
    acquire sensor data in real-time during a field operation that utilizes a reel to move equipment in a borehole in a geologic environment, wherein the sensor data comprise block position values of a traveling block that moves responsive to rotation of the reel during the field operation;

apply a filter to the sensor data wherein the filter comprises a half of a difference of Gaussians (DoG) filter wherein, along a dimension, a single maximum positive value decreases to a single minimum negative value that increases to approximately zero; and based on application of the filter to the data, issue a control signal to control the field operation.

20. The one or more non-transitory computer-readable storage media of claim 19, wherein the sensor data comprise hook load values for a hook operatively coupled to the traveling block.

* * * * *